US007101527B1

(12) United States Patent
Poling et al.

(10) Patent No.: US 7,101,527 B1
(45) Date of Patent: Sep. 5, 2006

(54) MIXED ANION MATERIALS AND COMPOUNDS FOR NOVEL PROTON CONDUCTING MEMBRANES

(75) Inventors: Steven Andrew Poling, Moorefield, WV (US); Carly R. Nelson, Ames, IA (US); Steve W. Martin, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 121 days.

(21) Appl. No.: 10/848,967

(22) Filed: May 19, 2004

(51) Int. Cl.
 C01B 17/00 (2006.01)
 C01D 13/00 (2006.01)
 C01G 17/00 (2006.01)
(52) U.S. Cl. .............................. 423/592.1; 423/593.1; 423/508; 423/511; 423/512.1; 423/518; 423/618; 423/263
(58) Field of Classification Search ............. 423/592.1, 423/593.1, 508, 511, 512.1, 518, 618, 263
See application file for complete search history.

(56) References Cited

U.S. PATENT DOCUMENTS

| 3,771,073 | A | | 11/1973 | Krause et al. | |
| 3,962,141 | A | | 6/1976 | Inoue et al. | |
| 4,199,357 | A | | 4/1980 | Yoshida et al. | |
| 4,439,411 | A | | 3/1984 | Manganaro et al. | 423/560 |
| 4,454,244 | A | * | 6/1984 | Woltermann | 502/208 |
| 4,542,108 | A | | 9/1985 | Susman et al. | |
| 4,880,761 | A | | 11/1989 | Bedard et al. | |
| 5,531,936 | A | | 7/1996 | Kanatzidis et al. | |
| 5,618,471 | A | | 4/1997 | Kanatzidis et al. | |
| 5,830,427 | A | | 11/1998 | Bedard et al. | |
| 7,018,604 | B1 | | 3/2006 | Poling et al. | |
| 2004/0096720 | A1 | * | 5/2004 | Poling et al. | 429/33 |

FOREIGN PATENT DOCUMENTS

WO  WO-0045447  8/2000

OTHER PUBLICATIONS

Kincs, J , et al., "Non-Arrhenius conductivity in glass: mobility and conductivity saturation effects", *Physical Review Letters*, 76(1), (Jan. 1, 1996),70-3.
Krebs, Bernt, et al., "Thio-Hydroxogermanates: a novel type of mixed tetrahedral anions", *Inorg. Chim. Acta*, 54-4, (1981),L123-L124.
Krebs, Bernt, et al., "Thio-hydroxo anions of germanium: preparation, structure and properties of $Na_2GeS_2(OH)_2 \cdot 5 H_2O$", *Z. Naturforsch., B: Anorg. Chem., Org. Chem.*, 36B(11), (1981),1400-6.
Martin, S W., et al., "Dc and ac Conductivity in Wide Composition Range $Li_2O$-$P_2O_5$ Glasses", *Journal of Non-Crystalline Solids*, 83(1-2), (Jun. 11, 1986),185-207.
Martin, S W., et al., "Ionic conduction in phosphate glasses", *Journal of the American Ceramic Society*, 74(8), (Aug. 1, 1991), 1767-83.

Martin, S W., et al., "Preparation of high-purity vitreous $B_2S_3$", *Journal of the American Ceramic Society*, 73(11), (Nov. 1990),3481-5.
PPG Industries, "Sodium Hydrosulfide", http://www.ppg.com/chm_chloralk/Bulletins/SodiumHydrosulf.pdf, (Jul. 2002).
Thomas, Sharon , et al., "Fuel Cells: Green Power", *Los Alamos National Laboratory, U.S. Department of Energy*, Publication No., LA-UR-99-3231,(1999),1-36.
Willard, H H., et al., "The Preparation and Properties of Potassium Thiogermante and Thiogermanic Acid", *Journal of the American Chemical Society 65*, (1943), 1887-1889.
Alberti, G, "Solid state protonic conductors, present main applications and future prospects", *Solid State Ionics, Diffusion & Reactions*, 145(1-4), (Dec. 2001),3-16.
Colomban, Philippe, "Tabe of Contents", *In: Proton conductors : solids, membranes, and gels-materials and devices*, Cambridge ; New York : Cambridge University Press,(1992).
Dzimitrowicz, D J., et al., "AC proton conduction in hydrous oxides", *Materials Research Bulletin*, 17(8), (Aug. 1982),971-9.
Haile, S M., et al., "Solid acids as fuel cell electrolytes", *Nature*, 410(6831), (Apr. 19, 2001),910-3.
Hara, S, et al., "Proton-conducting properties of hydrated tin dioxide as an electrolyte for fuel cells at intermediate temperature", *Solid State Ionics, Diffusion & Reactions*, 154-155, (Dec. 2002),679-85.
Kreuer, Klaus-Dieter , "Proton Conductivity: materials and applications", *Chemistry of Materials*, 8(3), (Mar. 1996),610-641.
Norby, T, "Solid-state protonic conductors: principles, properties, progress and prospects", *Solid State Ionics, Diffusion & Reactions*, 125(1-4), (Oct. 1999),1-11.
Norby, T, "The promise of protonics", *Nature*, 410(6831), (Apr. 19, 2001),877-8.
Stelle, B C., et al., "Materials for fuel-cell technologies", *Nature*, 414(6861), (Nov. 15, 2001),345-52.
Tricoli, V , "Cs/sup +/-doped poly-perfluorosulfonate membranes for application in direct methanol fuel cells", *Proceedings of the Second International Symposium on Proton Conducting Membrane Fuel Cells II*, (1999),358-64.
Abe, Yoshihiro , et al., "Electrical conduction due to protons and alkali-metal ions in oxide glasses", *Physical Review B (Condensed Matter)*, 48(21), (Dec. 1, 1993),15621-5.

(Continued)

*Primary Examiner*—Stanley S. Silverman
*Assistant Examiner*—Timothy C. Vanoy
(74) *Attorney, Agent, or Firm*—Schweqman, Lundberg, Woessner & Kluth P.A.

(57) ABSTRACT

The present invention provides new amorphous or partially crystalline mixed anion chalcogenide compounds for use in proton exchange membranes which are able to operate over a wide variety of temperature ranges, including in the intermediate temperature range of about 100 °C. to 300° C., and new uses for crystalline mixed anion chalcogenide compounds in such proton exchange membranes. In one embodiment, the proton conductivity of the compounds is between about $10^{-8}$ S/cm and $10^{-1}$ S/cm within a temperature range of between about −60 and 300° C. and a relative humidity of less than about 12%.

105 Claims, 17 Drawing Sheets

OTHER PUBLICATIONS

Abe, Yoshihiro, et al., "Protonic conduction in alkaline earth metaphosphate glasses containing water", *Journal of Non-Crystalline Solids*, 51(3), (Nov. 1982),357-65.

Angell, C A., "Mobile Ions in Amorphous Solids", *Annual Review of Physical Chemistry*, 43, (Oct. 1992),693-717.

Blomen, L. et al., EDS., "Fuel Cell Systems", *Copyright 1993, Plenum Press, New York*, ISBN 0-306-44158-6,(1993),xi-xix, 37-69.

Boolchand, P, et al., "Structure of GeS/sub 2/ glass: spectroscopic evidence for broken chemical order", *Physical Review B (Condensed Matter)*, 33(8), (Apr. 15, 1986),5421-34.

Cho, J, et al., "Infrared spectroscopy study of $xRb_2S+(1-x)B_2S_3$ glasses and polycrystals in the range $0 \leq X \leq 075$", *Physics and Chemistry of Glasses*, 36(6), (Dec. 1995),239-43.

Julien, C., et al., "Solid State Batteries: Materials Design and Optimization", *Copyright 1994, Kluwer Academic Publishers*, ISBN 0-7923-9460-7,(1994),v-viii, 97-175, 183-277.

Kaesaer, J A., "Hydrosulfides of Group I and Group II Metals", *Inorganic Chemistry 12*, (1973),3019-3020.

Kamitsos, E I., et al., "Structure and optical conductivity of silver thiogermanate glasses", *Journal of Solid State Chemistry*, 112(2), (Oct. 1994),255-61.

Karthikeyan, A, et al., "New Method to prepare polycrystalline meta-thioboric acid, $(HBS_2)_3$", *Inorganic Chemistry 41*, (2001),622-624.

Kawamoto, Yoji, et al., "Infrared and Raman spectroscopic studies on short-range structure of vitreous $GeS_2$", *Materials Research Bulletin*, 17(12), (Dec. 1982),1511-16.

\* cited by examiner

MIXED ANION MATERIALS AND COMPOUNDS FOR NOVEL PROTON CONDUCTING MEMBRANES

STATEMENT OF GOVERNMENT RIGHTS

This invention was made with support of the United States Government under Department of Energy's Hydrogen Program under Cooperative Agreement No. DE-FC36-00GO10-531. The Government has certain rights in this invention.

RELATED APPLICATION

This application is related to U.S. patent application Ser. No. 10/627,584 entitled, "Compounds for Novel Proton Conducting Membranes and Methods of Making Same," filed on Jul. 25, 2003, now issued as U.S. Pat. No. 7,018,604 and entitled "Compounds for Novel Proton Conducting Membranes," which is hereby incorporated by reference in its entirety.

FIELD

The present invention relates to materials and compounds useful for membranes, and, in particular to materials and compounds for novel proton conducting membranes and methods of making same.

BACKGROUND

Hydrogen-based fuel cells are becoming increasingly popular as an alternative to crude oil-based internal combustion engines. Specifically, hydrogen can be converted to electricity through the use of a hydrogen-oxygen fuel cell. The by-product of this type of a fuel cell is water, making this a "green" or environmentally-friendly technology. At the heart of the fuel cell is the proton exchange membrane (PEM), which transports protons from the anode to the cathode while providing electronic insulation between them. There are many types of electrolyte materials, each with specific limitations. Generally, such materials either have too low a proton mobility or don't operate in the intermediate temperature range (100 to 300° C.) to be useful for intermediate-temperature fuel cells.

Some of the most popular electrolyte materials are polymer exchange membranes, phosphoric acid membranes, and solid oxide membranes. Polymer exchange membranes, or more specifically solid organic polymer poly-perfluorosulfonic acids such as Nafion®, require hydration to maintain high proton conductivity. However, this limits their operation to temperatures below 100° C., thus requiring the use of expensive noble metal catalysts such as platinum. These electrolytes also suffer from fuel cross-over due to their porous hydrated nature. Phosphoric acid membranes are typically operated from 150° C. to 200° C. Since these membranes are liquid electrolytes, they suffer from membrane leakage and fuel cross-over problems. They also require the use of expensive platinum catalysts. Solid oxide membranes are typically operated between 700° C. to 1000° C., a temperature range in which the use of platinum as an electrode material can be reduced. Additionally, this temperature range is used to achieve the desired oxide anion conductivity. Since, these membranes are solid in nature, they do not suffer from fuel cross-over problems. However, there remains a temperature region between about 100° C. and 300° C. for which no one membrane currently available can provide optimum performance.

Thus, what is needed are materials and compounds for use in proton exchange membranes which are able to operate in a wide variety of temperature ranges, including in the intermediate temperature range of between about 100° C. to 300° C.

SUMMARY

An inorganic material or compound comprising $A_vM_wD_x(EH)_y \cdot (zH_2O)$, wherein A is one or more modifying cations; M is a metal, metalloid, transition metal or rare earth element; D and E are different Group VIB elements selected from the group consisting of O, S, Se, and Te; v, w, x, and y are positive integer numbers; and $z \geq 0$ is provided. (As used herein, the term "rare earth" is intended to include all of the lanthanide elements). In one embodiment, the material or compound has a mixed complex anion $M_wD_xE_y^{-(x+y)}$. In one embodiment, the material or compound has a mixed complex cation $M_wD_xE_y^u$ where u is an integer. In one embodiment, M is a transition metal. In a specific embodiment, the transition metal is yterrium, titanium or zirconium. In one embodiment, M is Ge. In one embodiment, the rare earth is a lanthanide. In a particular embodiment, the lanthanide is lanthanum. In one embodiment, the one or more modifying cations (A) are selected from the group consisting of an alkali metal cation, alkaline earth cation, yterrium cation, rare earth cation and combinations thereof.

The proton conducting materials and compounds of the present invention are amorphous, crystalline or mixed phase, i.e., partially crystalline. The proton conductivity for the materials and compounds of interest ranges from about $10^{-8}$ S/cm and $10^{-1}$ S/cm within a temperature range of between about −60 and 300° C. at a relative humidity ranging from 0 to 100%. In one embodiment, the proton conductivity ranges from about $10^{-3}$ to $10^{-2}$ S/cm for temperatures between about 100 and 275° C. under low relative humidities of less than about 12%.

In one embodiment, protonated compounds are obtained from an aqueous mixture of starting materials. In some embodiments the aqueous solution is heated. In one embodiment, crystalline proton conducting compounds are produced at room temperature by adding excessive amounts of acetone to the solution. In one embodiment, X-ray amorphous proton conducting materials are produced by slow heating (25° C.<T<100° C.) of the solution over a period of several days, which allows sufficient evaporation to occur to produce a recoverable film of proton conducting material.

The resulting products are amorphous, crystalline or mixed phase structures with structural incorporated protons (protonated). Some of these protonated materials and compounds, such as hydrated alkali thio-hydroxogermanates, have been found to be relatively stable in air and water, which is a requirement for hydrogen-oxygen fuel cell use. (Structural characterization of the obtained protonated materials and compounds was carried out using IR and Raman spectroscopies, DSC, TGA, and X-ray diffraction).

The present invention further provides a method comprising utilizing crystalline sodium thio-hydroxogermanate compounds in a proton conducting membrane. In one embodiment, the sodium thio-hydroxogermanate compound is $Na_3GeS_3(OH) \cdot 8H_2O$. In one embodiment, the sodium thio-hydroxogermanate compound is $Na_2GeS_2(OH)_2 \cdot 5H_2O$.

The protonated compounds or membrane materials described herein can easily be converted to membranes to provide electrochemical characterizations. In one embodiment, the present invention provides a chemically and thermally stable membrane comprising a mixed anion chalcogenide adaptable for use in a fuel cell at a temperature of between about −60° C. and 300° C., the material or compound having a proton conductivity of between about $10^{-6}$ to $10^{-1}$ S/cm. The mixed anion chalcogenide can be amorphous, crystalline or partially crystalline. In one embodiment, the temperature is between about 100° C. and 275° C. In one embodiment, the temperature is between about 100° C. and 150° C.

These new protonated materials may also serve as the proto-conducting phase in a mixed phase or composite proton exchange membrane. A mixed phase proton conducting membrane may be employed to optimize mechanical, chemical or thermal properties. In some embodiments inorganic-inorganic and inorganic-organic composite membranes are used, which may include the use of polymeric materials such as Nafion® in conjunction with the proton conducting materials of the present invention. Nafion® is a perfluorinated polymer that contains small proportions of sulfonic or carboxylic ionic functional groups.

In one embodiment, the invention provides a chemically and thermally stable membrane comprising a crystalline, amorphous or partially crystalline material (or compound) adaptable for use in a fuel cell at a temperature of between about −60° C. and 300° C., the material or compound having a proton conductivity of between about $10^{-6}$ to $10^{-1}$ S/cm. In one embodiment, these membranes will be useful in fuel cells at temperatures between about 100° C. and 275° C. In other embodiments, the membranes may be useful at temperatures less than about 100° C., such as approximately 0° C., particularly in applications such as purifiers. In other embodiments, the proton conductivity may be greater than about $10^{-3}$ S/cm, such as about $10^{-1}$ S/cm. In yet other embodiments, depending on the particular application, proton conductivities as low as about $10^{-7}$ S/cm are used, although such conductivities are likely too low for fuel cell applications, but perhaps useful for hydrogen sensors.

Being solid in nature, these membranes are not expected to exhibit fuel cross-over problems. Because of their inherent increased thermal-mechanical stability, the thermal and electrochemical stability of these membranes may be superior to that of Nafion® and Nafion®-like polymer membranes above 100° C. The compounds and protonated membranes described herein are useful in a variety of applications, as is known in the art, including fuel cell applications, reformers, purifiers, sensors, and the like.

DETAILED DESCRIPTION

Figure 1:
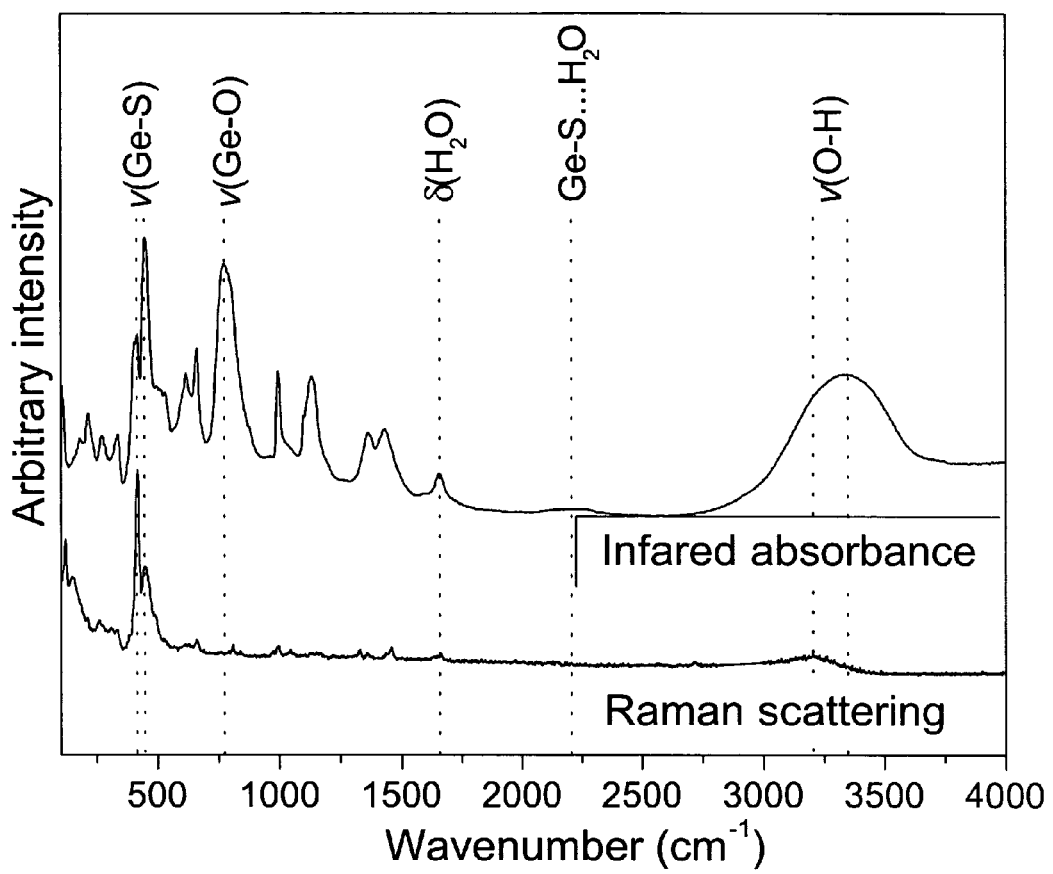
FIG. 1 shows far-IR, mid-IR and Raman spectra for amorphous cesium thio-hydroxogermanate in one embodiment of the present invention.

Embodiments of the present invention provide new mixed anion chalcogenides which are proton conducting materials and compound useful in proton exchange membranes. The present invention further provides new uses for known chalcogenides as proton exchange membranes. The membranes, in turn, are useful as fuel cell electrolyte membranes and other applications. The compounds include amorphous, crystalline and partially crystalline compounds which have suitable conductivity, thermal stability and chemical stability for such uses. These membranes are able to operate over a large temperature range, such as about −60° C. to 300° C. In one embodiment, a proton conductor having a mixed complex ion built upon a central metal or metalloid cation is provided. For example, the reaction of $GeO_2$ with CsSH in an aqueous solution at room temperature produces amorphous hydrated cesium thio-hydroxogermanate $Cs_2GeS_2$ $(OH)_2 \cdot zH_2O$ (0<z<5) with ionic conductivities between about $10^{-3}$ and $10^{-2}$ S/cm for temperatures of about 100 to 275° C. under low relative humidities, i.e., less than about 12%. Unlike conventional hydrated proton exchange membranes which rapidly dehydrate above 100° C., the conductivity of these and other mixed anion chalcogenide compounds decays slowly, i.e., over a period of about one (1) to 30 days, depending on the relative humidity.

As used herein, the term "compound" refers to a crystallographically known material. As used herein, the term "material" refers to an inorganic crystalline or amorphous phase material. As used herein, the term "membrane material" refers to a protonated material or compound. As used herein, the term "membrane" refers to proton-conducting solid electrolytes, which can otherwise be described as a densified or solid thin film of membrane material, typically less than about one (1) mm in thickness, used to separate and electronically insulate the anode and cathode from each other, and in some cases for electrochemical characterization of membrane electrode assembles (MEA). As used herein, the term "chalcogenide" as used herein refers to compounds consisting of elements from group VIA (Chemical Abstract Service version) of the periodic table including oxygen, sulfur, selenium, tellurium and any combination thereof. As used herein, the term "modifying cation" refers to cations which do not participate in forming a network structure, but instead produce non-bridging chalcogenides. The non-bridging chalcogenides ions carry a partial negative charge and are connected to the network forming metal or metalloid at one end only. As used herein, the term "metalloid" refers to an element, such as silicon or germanium, whose properties are intermediate between a "metal" and a "non-metal." "Metalloids" are also often referred to as "semi-metals."

New protonated materials and compounds made according to the present invention include, but are not limited to materials and compounds having the compositional formula $A_vM_wD_x(EH)_y \cdot (zH_2O)$ wherein A is a modifying cation selected from the group consisting of an alkali metal cation, alkaline earth cation, yterrium (Y) cation, rare earth cation and combinations thereof; M is a metal, metalloid, or rare earth element; D and E are different Group VIB elements selected from the group consisting of O, S, Se, and Te; and v, w, x, and y are positive integer numbers required for charge balance on M, and $z \geq 0$. In one embodiment, v>0, w=1, $x+y \leq 4$.

M can be any element that is thermodynamically stable in mixed anion configurations, such that the enthalpy of bond formation between M-D and M-E, is similar, i.e., within a range of no more than about 250 kJ/mol. For example, when M=Ge, D=S, and E=O, the enthalpies of formation for Ge—S and Ge—O are approximately 534 kJ/mol and 659 kJ/mol, respectively. In one embodiment M is a transition metal such as yterrium, titanium or zirconium. In one embodiment, M is Ge. In one embodiment, M is a rare earth element, such as lanthanum. In one embodiment, the composition includes the mixed complex anion $M_wD_xE_y^{-(x+y)}$ wherein v, w, x, and y are positive integer numbers; and $z \geq 0$. In another embodiment the composition includes $M^wD_xE_y^{-u}$ where u is an integer as the mixed complex anion. In one embodiment, there is more than one M present, such as an electronically insulative compound M (e.g., germanium) and an electronically conductive compound M' (such as titanium).

In one embodiment, new protonated materials and compounds include, but are not limited to, hydrated mixed anion proton conductors, in which z>0. In one embodiment, 0<z<8. In another embodiment, 0<z<5. In one embodiment, new protonated materials and compounds include, but are not limited to, anhydrous mixed anion proton conductors, in which z=0. Such materials and compounds may be considered basic or acidic depending on the M-E versus E-H bond strength. In one embodiment, new protonated materials and compounds include, but are not limited to, mixed anion proton conductors denoted as hydroxides. In this embodiment, D is a Group VIB element selected from the group consisting of S, Se, and Te and E is the element O. In one embodiment, new protonated materials and compounds include, but are not limited to, mixed anion proton conductors denoted as hydrosulfides, in which D is a Group VIB element selected from the group consisting of O, Se, and Te and E is the element S. In one embodiment, new protonated materials and compounds include, but are not limited to, mixed anion proton conductors denoted as salts, in which A is modifying cation such as an alkali metal cation (e.g., $Li^+$, $Na^+$, $K^+$, $Rb^+$, $Cs^+$), alkaline earth cation (e.g., $Mg^{2+}$, $Ca^{2+}$, $Sr^{2+}$, $Ba^{2+}$), yterrium ($Y^{3+}$) cation, rare earth cation, and combinations thereof. In one embodiment, new protonated materials and compounds include, but are not limited to, mixed oxygen-sulfur anion proton conductors denoted as oxysulfides, in which D and E are Group VIB elements, but not the same, selected from the group consisting of O and S. In other embodiments D and E are Group VIB elements, but not the same, selected from the group of O and Se, O and Te, S and Se, S and Te, or Se and Te.

In one embodiment, proton conducting materials and compounds for use in proton conducting membranes are produced from the known crystalline sodium thio-hydroxogermanate compounds $Na_2GeS_2(OH)_2 \cdot 5H_2O$ and $Na_3GeS_3(OH) \cdot 8H_2O$.

In one embodiment, the proton conducting compounds for use in proton conducting membranes are produced from partially crystalline compounds, which include, but are not limited to, $A_vMwDx(EH)_y \cdot (zH_2O)$ wherein A is a modifying cation selected from the group consisting of an alkali metal cation, alkaline earth cation, yterrium (Y) cation, rare earth cation and combinations thereof; M is a metal, metalloid or rare earth element; D and E are different Group VIB elements selected from the group consisting of O, S, Se and Te; and v, w, x and y are positive integer numbers required for charge balance on M and $z \geq 0$. In one embodiment, v>0, w=1, $x+y \leq 4$.

In one embodiment, the new protonated material is an X-ray amorphous hydrated alkali thio-hydroxogermanate $A_vGeS_v(OH)_{4-v} \cdot zH_2O$ (A=alkali; 1<v<4; 0<z<8). In one embodiment, the new protonated material or compound is hydrated cesium thio-hydroxogermanate $Cs_2GeS_2(OH)_2 \cdot zH_2O$ (0<z<5) with ionic conductivities between about $10^{-3}$ and $10^{-2}$ S/cm for temperatures of about 100 to 275° C. under low relative humidities, less than about 12%. In one embodiment, the new protonated material or compound is hydrated cesium thio-hydroxogermanate $Cs_3GeS_3(OH) \cdot zH_2O$ (0<z<8) with ionic conductivities between about $10^{-3}$ and $10^{-2}$ S/cm for temperatures of about 100 to 275° C. under low relative humidities, less than about 12%. In one embodiment, the new protonated material or compound is hydrated rubidium thio-hydroxogermanate $Rb_2GeS_2(OH)_2 \cdot zH_2O$ (0<z<5) with ionic conductivities between about $10^{-3}$ and $10^{-2}$ S/cm for temperatures of about 100 to 275° C. under low relative humidities, i.e., less than about 12%. In one embodiment, the new protonated material or compound is hydrated rubidium thio-hydroxogermanate $Rb_3GeS_3(OH) \cdot zH_2O$ (0<z<8) with ionic conductivities between about $10^{-3}$ and $10^{-2}$ S/cm for temperatures of about 100 to 275° C. under low relative humidities, i.e., less than about 12%. In one embodiment, the new protonated material or compound is hydrated potassium thio-hydroxogermanate $K_2GeS_2(OH)_2 \cdot zH_2O$ (0<z<5) with ionic conductivities between about $10^{-3}$ and $10^{-2}$ S/cm for temperatures of about 100 to 275° C. under low relative humidities, i.e., less than about 12%. In one embodiment, the new protonated material or compound is hydrated potassium thio-hydroxogermanate $K_3GeS_3(OH) \cdot zH_2O$ (0<z<8) with ionic conductivities between about $10^{-3}$ and $10^{-2}$ S/cm for temperatures of about 100 to 275° C. under low relative humidities, i.e., less than about 12%. In one embodiment, the new protonated material or compound is hydrated sodium thio-hydroxogermanate $Na_2GeS_2(OH)_2 \cdot zH_2O$ (0<z<5) with ionic conductivities between about $10^{-3}$ and $10^{-2}$ S/cm for temperatures of about 100 to 275° C. under low relative humidities, i.e., less than about 12%. In one embodiment, the new protonated material or compound is hydrated sodium thio-hydroxogermanate $Na_3GeS_3(OH) \cdot zH_2O$ (0<z<8) with ionic conductivities between about $10^{-3}$ and $10^{-2}$ S/cm for temperatures of about 100 to 275° C. under low relative humidities, i.e., less than about 12%. In one embodiment, the forgoing foregoing materials are amorphous materials.

In one embodiment, the proton conducting materials and compounds for use in proton conducting membranes are produced from anhydrous materials and compounds, which include, but are not limited to $A_vMwDx(EH)_y$, wherein A is a modifying cation selected from the group consisting of an alkali metal cation, alkaline earth cation, yterrium (Y) cation, rare earth cation and combinations thereof; M is a metal, metalloid or rare earth element; D and E are different Group VIB elements selected from the group consisting of O, S, Se and Te; and v, w, x and y are positive integer numbers required for charge balance on M and $z \geq 0$. In one embodiment, v>0, w=1, $x+y \leq 4$.

In one embodiment, new protonated materials and compounds may be obtained from an aqueous solution of $A_v(DH)_x$ and $M_wE_y$, $A_v(EH)_y$ and $M_wD_x$, $A_vD_x$ and $M_wE_y$, or $A_vE_y$ and $M_wD_x$ (with A, D, E and M as well as v, x, y, and z as defined above), or any suitable combination of suitable reactants. The aqueous solution may be contained in flat-bottom glassware or other suitable container. The aqueous solution may or may not be supersaturated by low heating (e.g., $T \leq 100°$ C.). Crystalline proton conducting material and compounds are typically isolated at room temperature by adding acetone to the solution. X-ray amorphous proton conducting materials and compounds are typically recovered by low heating of the solution (e.g. 25° C.<T<100° C.) over a period of several days to allow the water of solution to evaporate so that a resulting film of proton conducting material can be recovered. In one embodiment, an aqueous solution of 2CsSH and $GeO_2$ supersaturated at about 75° C. is evaporated for one week to produce amorphous hydrated cesium thio-hydroxogermanate $Cs_2GeS_2(OH)_2 \cdot zH_2O$ (0<z<5). In other embodiments, the temperature is lower or higher, the reaction is carried out under pressure, and other parameters are varied as desired, while still achieving the same results.

The particular order in which the reactants are added does not appear to affect the results. Additionally, precise amounts of the reactants will vary depending on the specific modifying cation being used (e.g., $Na^+$, $K^+$, $Rb^+$, $Cs^+$ and combinations thereof), the compositional form of the alkali (e.g., ASH, AOH, $A_2S$, $A_2O$ and combinations thereof, where A is as defined above), the type and form of the M compound used, e.g., whether germanium or a rare earth is used and whether the element is combined with $O_2$, $S_2$ or some other compound, the ratio of A to M, and so forth.

Although the examples described herein use about 0.5 g of each reactant in combination with five (5) mL of deionized water, it is possible to vary this ratio as needed to produce the same products. Additionally, although either deionized or distilled water is preferred, it is also possible to use tap water, as overall conductivity would likely not be affected. However, trace impurities in tap water would show up in the vibration spectra. Other liquids, such as $H_2S$, $H_2Se$, $H_2Te$, and the like, as described in U.S. patent application Ser. No. 10/627,584, supra, can also be used. The examples further describe the use of a beaker for carrying out the reaction, although, in practice any suitable type of container, including any suitable commercial-sized container can be used. Additionally, although the examples describe the container as covered with an aerated paraffin film, in practice, any type of conventional covering can be used, which will vary depending on whether the reaction is being carried out in a laboratory or in a commercial setting. In one embodiment, the environment is substantially dust-free and no cover is used. Further, although the examples describe the use of a hot plate with magnetic stirring, in practice, any suitable type of heating device can be used. In most embodiments, stirring is preferably used to help the reactants dissolve in the water and is thereafter not required. In other embodiments, any type of agitation or shaking is used to aid the reaction.

In one embodiment, the removal of the excess water of solution from the reaction products can be facilitated through vacuum drying, i.e. heating the samples about 100° C. with about 100 mTorr vacuum for a day. This can significantly reduce drying time and reduce costs in commercial operations. In another embodiment, the products are further purified by repeating the reaction procedure.

In a specific embodiment, the invention provides a new class of amorphous protonated mixed anion alkali thio-hydroxogermanates. Based on starting compositions and vibrational structures, these materials or compounds may be generally written as $A_yGeS_y(OH)_{4-y} \cdot xH_2O$ (A=modifying cation; $1 < y \leq 4$; 0<x<8). These new hydrated materials possess increased thermal stability against dehydration even at low relative humidity levels. Additionally, these mixed anion materials do not rely on a phase transition and do not become ductile at elevated temperatures. With regard to solubility in water, however, these specific alkali thio-hydroxogermanates behave similar to hydrophilic salts. (See Example 1). Known hydrated crystalline sodium thio-hydroxogermanates can be prepared by precipitation from aqueous solutions using excessive amounts of acetone at room temperature. Reactants include, but are not limited to, NaOH, $Na_2S$, $GeO_2$, and/or $GeS_2$. For example, a mixed anion tetrahedral unit for germanium in the form of $Na_2GeS_2(OH)_2 \cdot 5H_2O$ having an orthorhombic unit cell with space group Pbcn (space group number 60 in International Tables) and $Na_3GeS_3(OH) \cdot 8H_2O$ having a monoclinic unit cell with space group C2/c (space group number 15 in International Tables) is known. The structures reveal very basic oxygens, with d (Ge—O) of 1.812 Å and 1.877 Å for the di- and trivalent thio-hydroxogermanate ions, respectively. This compares to normal germanates with d(Ge—O) ranging between 1.71 and 1.78 Å. Additionally, a large open framework with extensive hydrogen bonding is known with S···HO and O···HO connecting the thio-oxoanions to the alkali. (See Example 1). Amorphous hydrated materials of the general form $A_xGeS_x(OH)_{4-x} \cdot yH_2O$ ($1 \leq x \leq 4$; 0<y<8) for A=Na, K, Rb, and Cs were also synthesized using an aqueous solution containing stoichiometric amounts of the alkali hydrosulfide, 97.9 to 99.9% ASH (alkali hydrosulfide, where A is an alkali metal of Na, K, Rb or Cs which can be made in any conventional manner, including the methods described in U.S. patent application Ser. No. 10/627,584, supra), and commercial quartz-type $GeO_2$ (Cerac 99.99%, approximately 325 mesh). The corresponding reactions may be written as:

$$xASH + GeO_2 + (y+2-x)H_2O \rightarrow A_xGeS_x(OH)_{4-x} \cdot yH_2O,$$
$$1 \leq x \leq 4$$

Details on the various compounds and materials produced and their conductivities are shown in Example 2.

Hydrated materials and compounds of other forms can also be synthesized using other reactants such as AOH, $A_2O$, $A_2S$ and $GeS_2$. Example reactions include:

$$xASH + GeS_2 + (y+4-x)H_2O \rightarrow A_xGeS_x(OH)_{4-x} \cdot yH_2O + 2H_2S; \ 1 \leq x \leq 4$$

$$x/2 A_2S + GeS_2 + (y+4-x)H_2O \rightarrow A_xGeS_x(OH)_{4-x} \cdot yH_2O + (2-x/2)H_2S; \ 1 \leq x \leq 4$$

$$x/2 A_2O + GeS_2 + (y+4-3x/2)H_2O \rightarrow A_xGeS_x(OH)_{4-x} \cdot yH_2O + (2-x)H_2S; \ 1 \leq x \leq 2$$

$$xAOH + GeS_2 + (y+4-2x)H_2O \rightarrow A_xGeS_x(OH)_{4-x} \cdot yH_2O + (2-x)H_2S; \ 1 \leq x \leq 2$$

$$AOH + (x/2-1/2)A_2S + GeS_2 + (y+3-x)H_2O \rightarrow A_xGeS_x(OH)_{4-x} \cdot yH_2O + (3/2-x/2)H_2S; \ 1 \leq x \leq 3$$

$$ASH + (x/2-1/2)A_2S + GeS_2 + (y+4-x)H_2O \rightarrow A_3GeS_3(OH) \cdot yH_2O + (5/2-x/2)H_2S; \ 1 \leq x \leq 4$$

Dried translucent products can be obtained by any methods known in the art, including the methods described in the Examples below.

Example 3 provides examples of syntheses of mixed anion compounds using various transition metals; namely, zirconium, titanium and lanthanum. In one embodiment sodium is used as the modifying cation with lanthanum, zirconium or titanium, although the invention is not so limited.

As noted above, the present invention provides, in one embodiment, measurable proton conductivity in hydrous and anhydrous chalcogenide samples and further demonstrates thermal and chemical stability. In one embodiment, the proton conductivity of the materials and compounds produced is between about $10^{-10}$ and $10^{-2}$ S/cm within a temperature range of between about zero (0) and 300° C. Ideally, these proton conducting materials will be useful in fuel cell membranes at temperatures between about 100 and 275° C. with a proton conductivity of between about $10^{-3}$ to $10^{-2}$ S/cm. In other embodiments, the proton conducting membranes may be useful at temperatures less than 100° C., such as approximately room temperature. In other embodiments, the proton conducting membranes may be useful at temperatures greater than 300° C., such as approximately 450° C. In other embodiments, the proton conductivity may be greater than $10^{-2}$ S/cm, such as about $10^{-1}$ S/cm. In yet other embodiments, depending on the particular application, proton conductivities as low as about $10^{-7}$ S/cm are used, although such conductivities are likely too low for fuel cell applications, but perhaps useful for hydrogen sensors. Solid natured proton conducting membranes are not expected to exhibit fuel cross-over problems. Because of their inherent increased thermal-mechanical stability, the thermal and electrochemical stability of these proton conducting membranes may be superior to that of Nafion® and Nafion®—like polymer membranes above 100° C.

In developing new proton conducting membrane materials, it is important to test the diffusion behavior of protons in the respective materials an compounds. Proton conducting samples can be tested using a.c. impedance measurements. Proton self-diffusion coefficients of these proton conducting samples can be determined from $H^1$-NMR spin-echo pulse sequences with magnetic field gradient pulses. Thermal and chemical stability of these proton conducting samples can be measured using thermogravimetric analysis where non-reactive atmospheres, such as nitrogen or argon, can be used to determine the thermal stability of the sample, and reactive atmospheres of oxygen and water vapor can be used to determine the chemical stability of the sample. Thereafter, for samples possessing both good proton conductivity and thermal and chemical stabilities, a working membrane can be fabricated to which a pressure differential of hydrogen can be applied.

The protonated materials and compounds described herein can easily be converted to proton conducting membranes. One method involves pressing fine powders into a pellet. Other methods, which are variations of this technique known in the art, can also be used. In one embodiment, the well-known method of thin film processing is used to process thin films of the membrane materials. In other embodiments, the proton conducting membranes may be a solid, liquid, or liquid-like gel. These new protonated materials or compounds may also serve as the proton-conducting phase in a mixed phase or composite proton exchange membrane. A mixed phase proton conducting membrane may be employed to optimize mechanical, chemical, or thermal properties. Various inorganic-inorganic or inorganic-organic composite membranes may be envisioned, including the use of polymeric materials such as Nafion®. The presence of alkali has also been shown to reduce methanol permeability in Nafion® membranes. These alkali thio-hydroxogermanates also appear to be very tolerant to $H_2S$ and $CO_2$ since no impurities where observed in the materials after being submerged in liquid $H_2S$ for 3 weeks at room temperature or being exposed to humidified air at 200° C. for a week.

The protonated membranes described herein are useful in fuel cell applications. However, as those skilled in the art understand, the ability of a membrane to transport protons is also useful in other applications such as hydrogen reformers, purifiers, sensors and the like.

The present invention will be further described in the following non-limiting Examples:

EXAMPLE 1

$Cs_2GeS_2(OH)_2 \cdot xH_2O$ (0.2<x<0.5) (Thio-Hydroxogermanate) Synthesis

Amorphous materials of the form $Cs_2GeS_2(OH)_2 \cdot xH_2O$ (0.2<x<0.5) were synthesized from an aqueous solution containing stoichiometric amounts of the cesuim hydrosulfide, CsSH (synthesized according to the methods described in U.S. patent application Ser. No. 10/627,584, supra), and >99.9% pure commercial quartz-type $GeO_2$ manufactured by Cerac, Inc. having offices in Milwaukee, Wis., and having an approximately 325 mesh.

The corresponding reaction may be written as:

$$2CsSH + GeO_2 + xH_2O \rightarrow Cs_2GeS_2(OH)_2 \cdot xH_2O$$
$$(0.2 < x < 0.5)$$

The reactions were carried out by first adding the solid reactants (0.38 g of CsSH and 0.12 g of $GeO_2$) to a 100 mL Pyrex® or Nalgene®-brand beaker and then adding five (5)

mL of deionized water, which had previously been heated to approximately 75° C. The beaker was then covered with an aerated paraffin film and placed on top of a Corning model PC-420 brand hot plate set at 75° C. A dried translucent film was deposited in the beaker after allowing the excess water to evaporate at about 75° C. for approximately three (3) to nine (9) days. The samples were then stored under a dry He atmosphere.

Structural Characterization

The IR absorption spectra were collected at 298° K with a Bruker IFS 66v/S spectrometer using 32 scans and 4 cm$^{-1}$ resolution in both the mid-IR and far-IR regions. Translucent pressed CsI powder pellets were prepared for transmission using about one (1) wt % of sample. The Raman scattering spectra were collected at 298° K with a Bruker FT-Raman RFS 100/S spectrometer using a 1064 nm Nd:YAG laser, 32 scans, 2 cm$^{-1}$ resolution, and 300 mW of power focused on an approximately 0.1 mm diameter spot size. Powdered samples were packed into a small aluminum cup-like sample holder and covered with a clear amorphous tape. Powder XRD spectra were collected at 298° K with a Scintag XDS-2000 diffractometer using Cu K$_\alpha$ radiation ($\lambda$=1.54178 Å), 40 kV, and 30 mA. Scans were performed between 20° to 120° 2θ using a 0.02° step size and 0.5 sec dwell time. Powdered samples were packed into a recessed square polycarbonate sample holder and covered with 0.001 inch thick Kapton® tape.

Thermal Characterizations

Thermal mass loss measurements were performed with a Perkin Elmer Thermogravimetric Analyzer TGA 7 (TGA). Specifically, about four (4) mg of sample was placed in an open aluminum sample pan. The sample was then heated in the furnace at rate of about 10° C./minute from 50 to 300° C. using a 20 mL/minute flow of N$_2$ as the sample purge gas.

Phase transitions were investigated using a Perkin Elmer Pyris Diamond Differential Scanning Calorimeter (DSC). Specifically, about 15 mg of sample was placed in an aluminum sample pan and hermetically sealed. The sample was then heated at a rate of about 10° C./minute from about 50 to 300° C.

Conductivity Measurements

In addition to collecting a.c. impedance data on the protonated reaction products, the conductivity of the decomposed, i.e. fully dehydrated, materials was also measured to estimate the ratio of proton to alkali conductivity. A Gamry PC4/750 potentiostat was used in the frequency range of 0.2 Hz to 100 kHz using 0.5 V amplitude on pressed powder samples. Hardened steel blocking electrodes pressed into a Teflon® sleeve sealed the powder samples for anhydrous atmosphere testing. An alumina tube was used to contain the powder samples for hydrated atmosphere testing. Between 60 and 100 mg of each sample was pressed inside the ¼ inch ID Teflon® sleeves or alumina tubes using about 82 kpsi of pressure with pellet thickness ranging from 0.4 to 0.6 mm. Constant contact pressure was maintained on the pellet/electrode assembly during the measurement inside a chamber that maintained a controlled pressure of flowing air (approximately one (1) L/minute). The chamber temperature (22<T<300° C.) was controlled by a custom-built tubular furnace. The percent relative humidity was controlled by the chamber pressure (1<P<7 atm) and bubbling the dry air (approximately 0% relative humidity at standard temperature and pressure) through a controlled temperature water bath (22<T<100° C.).

Heating and cooling cycles were conducted during the conductivity measurements. Such heating and cooling cycles were performed using positive and negative increments, respectively, of 10 to 15° C. after allowing the sample temperature to stabilize at each increment for a predetermined time of typically about 15 or 30 minutes. The first heating cycle typically consisted of measurements obtained from ambient temperature, i.e., approximately 25° C., to the maximum temperature, i.e., approximately 300° C. The first cooling cycle then followed, consisting of measurements obtained from the maximum temperature to ambient temperature. The second heating cycle then followed consisting of measurements obtained from ambient temperature to the maximum temperature, and so on.

The ratio of proton to alkali mobility may be estimated in situ by thermally cycling the sample, i.e. impedance measurements from the first heating cycle represented a combination of proton and alkali mobility whereas the impedance measurements from the second heating cycle represented mostly alkali mobility of the decomposed (dehydrated) sample. Time-depended conductivity measurements were performed using increments of 15 to 60 minutes while holding the temperature and relative humidity constant.

Results

Powder X-ray diffraction (XRD) patterns indicate the as-prepared cesium thio-hydroxogermanate $Cs_2GeS_2(OH)_2 \cdot xH_2O$ is non-crystalline with no diffraction peaks observed between 20° to 120° 2θ. The amorphous nature is consistent with the evaporation-precipitation preparation route employed at about 75° C. versus the acetone separation route at room temperature reported for crystalline $Na_2GeS_2(OH)_2 \cdot 5H_2O$ and $Na_3GeS_3(OH) \cdot 8H_2O$. FIG. 1 shows the infrared absorption and Raman scattering spectra for as-prepared $Cs_2GeS_2(OH)_2 \cdot xH_2O$. Vibrational modes attributable to Ge—S, Ge—O and O—H stretching can be observe with peak intensities between 455–415 cm$^{-1}$, 785–77 cm$^{-1}$ and 3400–3200 cm$^{-1}$, respectively. This spectra suggests the presence of a $GeS_2O_2^{4-}$ ion similar to that reported for $Na_2GeS_2(OH)_2 \cdot 5H_2O$. This thio-oxoanion may be approximated by a point symmetry group of $C_{2v}$ with $v_1(A_1)$ symmetric Ge—S, $v_6(B_1)$ asymmetric Ge—S, and $v_8(B_2)$ asymmetric Ge—O stretching modes observable at about 417, about 448, and about 775 cm$^{-1}$, respectively.

Figure 2:
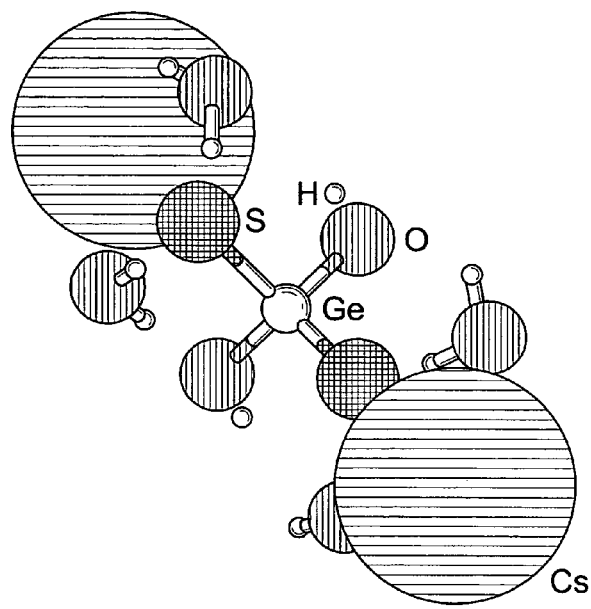
FIG. 2 shows a ball-and-stick schematic of amorphous cesium thio-hydroxogermanate in one embodiment of the present invention.

FIG. 2 shows a ball-and-stick schematic of amorphous cesium thio-hydroxogermanate $Cs_2GeS_2(OH)_2 \cdot xH_2O$. Additionally, O—H stretching, H—O—H bending, and lower frequency rotatory (librations) modes are observed between 3400–3200, 1657, and 1425–600 cm$^{-1}$, respectively. Vibrational modes attributable to phase impurities of CsSH, CsOH, $Cs_2CO_3$, $GeO_2$, and $GeS_2$ are not evident in the spectra.

The stable form of these alkali thio-hydroxogermanates (i.e. liquid-like gel vs. solid) depends on temperature and relative humidity. These materials behave very similar to salts with respect to solubility in water, i.e. water readily hydrates the component alkali. In general, these solubility issues may be addressed by operating above the steam point in non-condensing conditions. Water in these hydrated materials may be generally classified in order of increasing thermal stability as chemisorbed water, water with elaborate hydrogen bonding, and structural hydroxyl groups. The chemisorbed water is observed to evaporate at room temperature under a dry atmosphere. In the TGA thermogram shown in FIG. 3, two pronounced inflection points can be observed above the preparation temperature of about 75° C. Specifically, one inflection point can be observed at about 275° C. and another at about 400° C.

Figure 3:
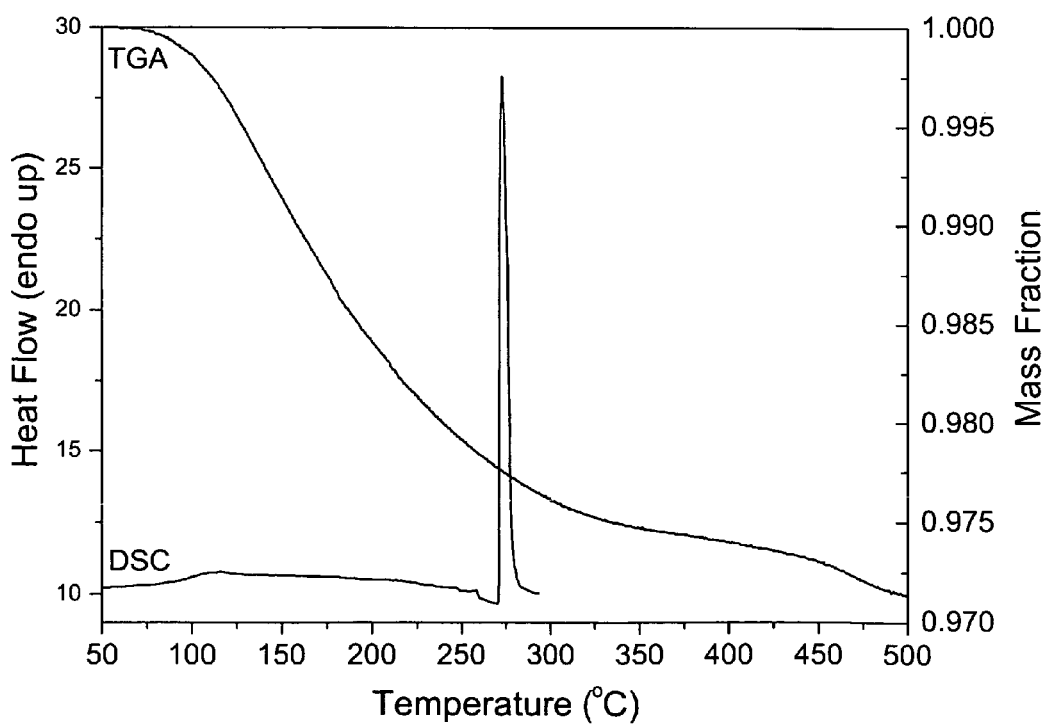
FIG. 3 shows DSC and TGA spectra for cesium thio-hydroxogermanate using a 10° C./minute scan rate and a 20 mL/minute dry $N_2$ purge in embodiments of the present invention.

From the vibrational spectra of the decomposed samples and the corresponding DSC thermogram in FIG. 3, the first inflection at about 275° C. may be attributed to the removal of most of the molecular water with elaborate hydrogen bonding associated with the hydrated cation shell. The second inflection point at about 400° C. may be attributed to the thermal decomposition of the structural hydroxyl groups and the formation of bridging oxygens.

Figure 4:
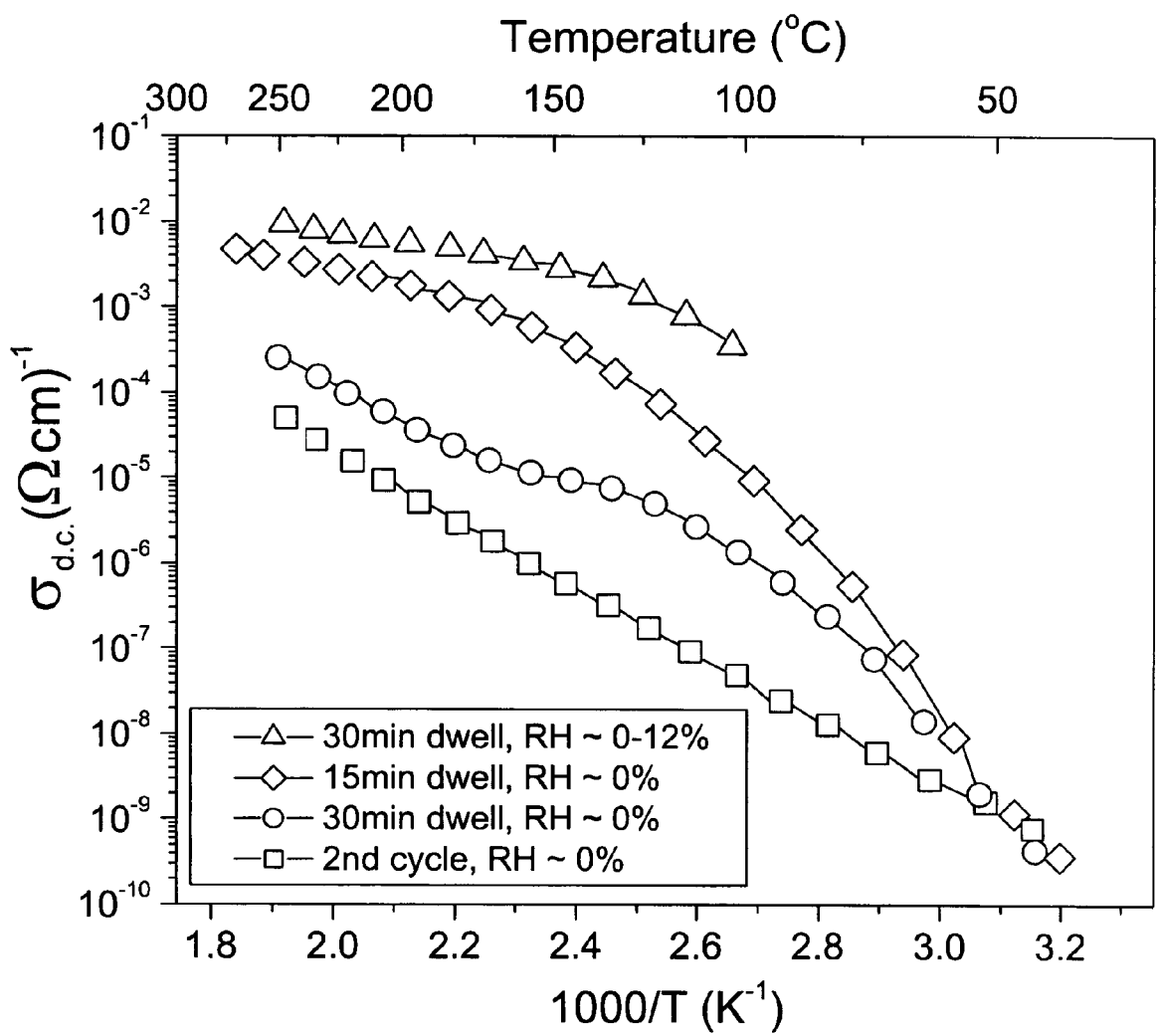
FIG. 4 is an Arrhneius temperature dependent plot of d.c. conductivity values for cesium thio-hydroxogermanate at about one (1) atmosphere under varying humidification levels and dwell times in embodiments of the present invention.

As shown in FIG. 4, d.c. conductivities for low relative humidity measurements of the cesium thio-hydroxogermanate are between $10^{-2}$ and $10^{-3}$ S/cm for temperatures between about 100° C. (relative humidity about 12%) and 275° C. (relative humidity about 0%). There are four potential ionic charge carriers in this material: the monovalent alkali ($Cs^+$), hydronium ions ($H_3O^+$), hydroxyl ions ($OH^-$), and protons ($H^+$). Generally, two competing mechanisms are expected for proton conduction, namely vehicle and Grotthuss or free-proton types. The proton conduction mechanism is not yet clear in these alkali thio-hydroxogermanates, but conductivity does appear to be mediated by both the presence of the extrinsic or hydrated water and the intrinsically bound hydroxyl groups. Additionally, the much lower alkali mobility appears to dominate for dehydrated conditions. The ratio of proton to alkali mobility may be obtained by comparing the humidified and dehydrated conductivities. Specifically, a fully dehydrated material (i.e., x is approximately 0) is expected for the second conductivity cycle performed under a dry atmosphere; this is supported by TGA and vibrational spectra measurements.

From these measurements, it is estimated that at about 200° C., less than 0.5% of the total conductivity may be attributed to Cs mobility. The change in conductivity and activation energy values with longer dwell times and less humidification may indicate a reduction in mobile protonic species and the collapse of the open framework structure. The vibrational spectra of dehydrated samples and the DSC thermogram suggest the thio-oxoanion remains in an amorphous configuration up to about 275° C.

Figure 5:
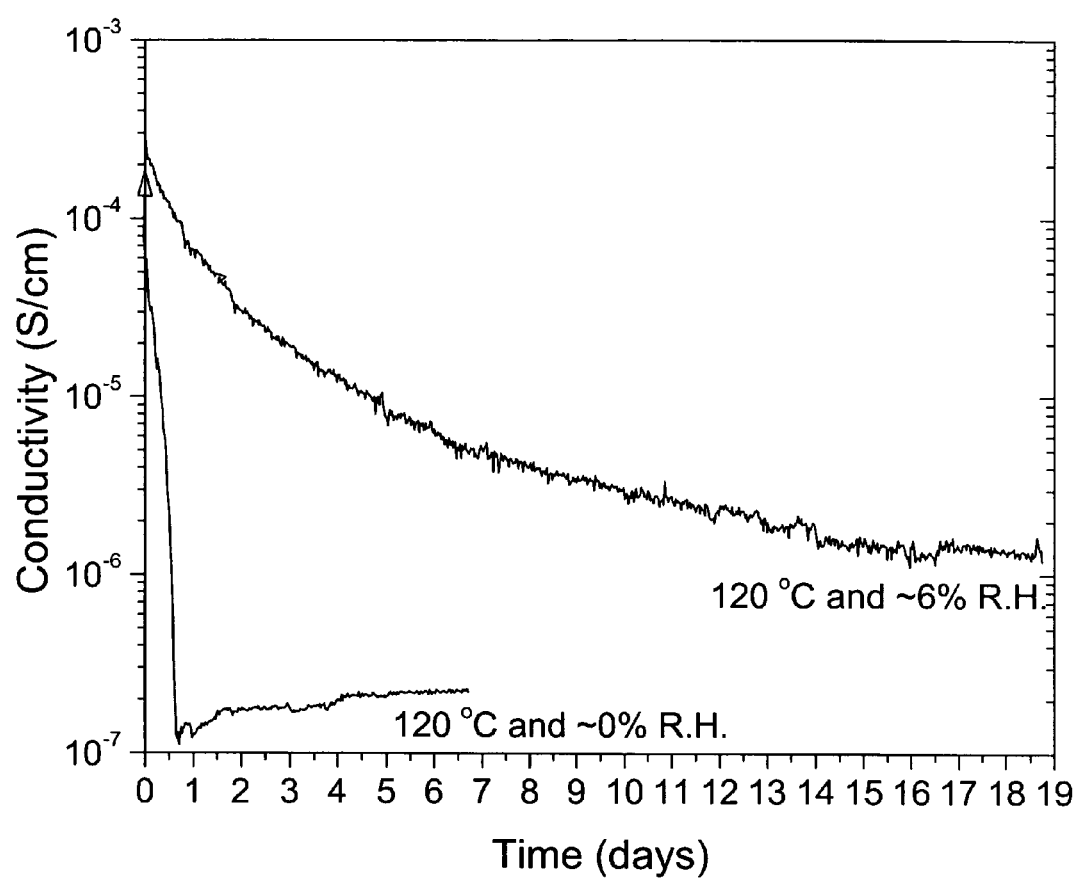
FIG. 5 shows d.c. conductivity for cesium thio-hydroxogermanate as a function of time at varying humidity levels in embodiments of the present invention.

As shown in FIG. 5, at about 120° C. the conductivity is observed to decay slowly with about six (6) % relative humidity. This is in contrast to the rapid decay of the ionic conductivity in a dry atmosphere, also apparent in FIG. 5. While definitive long-time experiments have not been performed, it appears that at approximately 120° C. and approximately six (6) % relative humidity, the conductivity reaches a limiting value of about $10^{-4}$ S/cm.

EXAMPLE 2

$A_xGeS_x(OH)_{4-x} \cdot yH_2O$ ($1 \leq x \leq 4$; $0<y<8$) for A=Na, K, Rb, and Cs All test conditions were as described above in Example 1, including synthesis methods and equipment (including reactant amounts, etc.), structural characterizations, thermal characterizations and conductivity measurements. However, in this example, the materials synthesized were of the form:

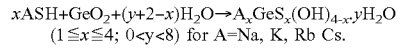

The corresponding reaction may be written as:

$xASH+GeO_2+(y+2-x)H_2O \rightarrow A_xGeS_x(OH)_{4-x} \cdot yH_2O$
($1 \leq x \leq 4$; $0<y<8$) for A=Na, K, Rb Cs.

Results

Figure 6:
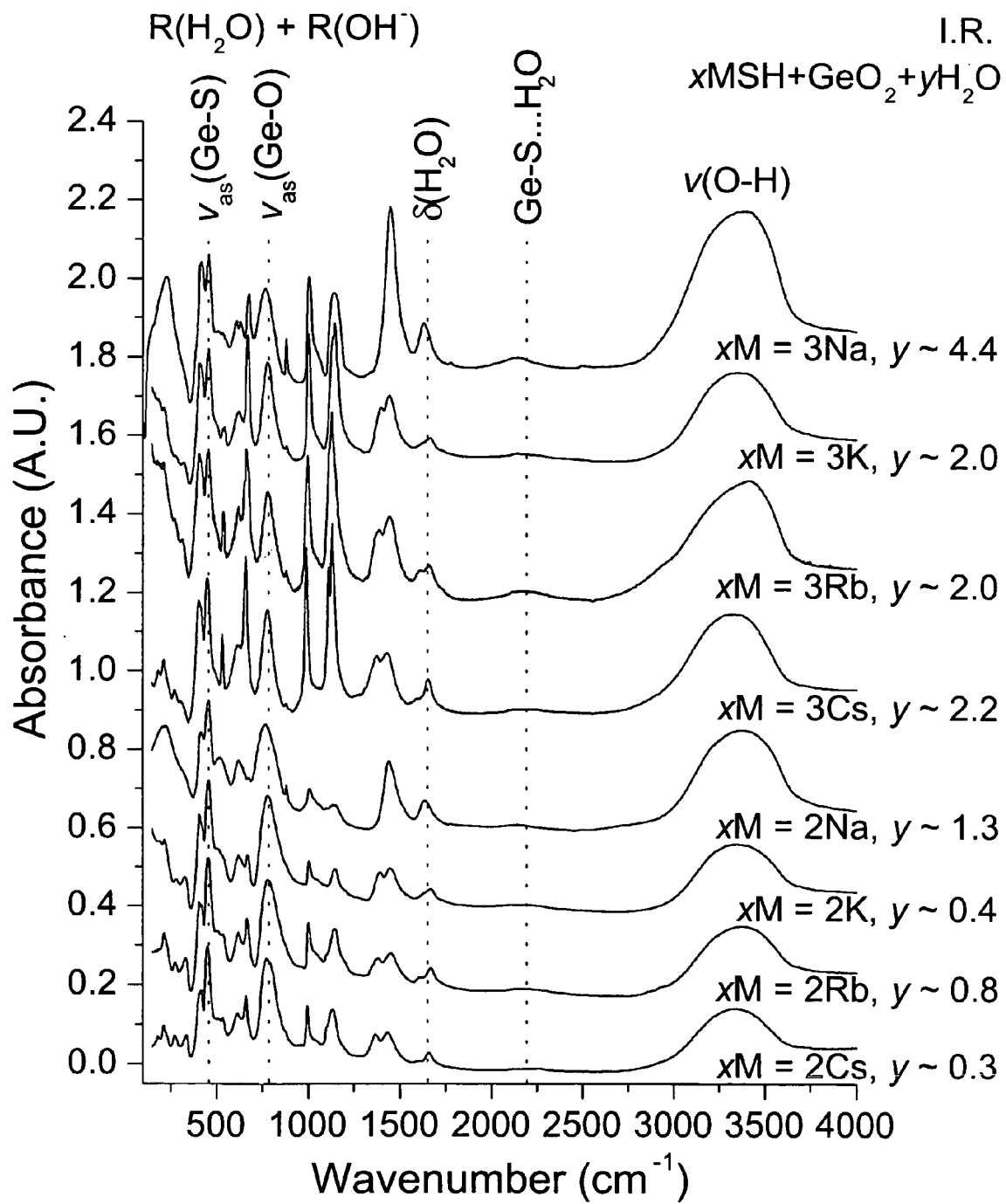
FIG. 6 shows far-IR and mid-IR spectra for xASH+$GeO_2$+y$H_2O$ reaction products (x=2 and 3; A=Na, K, Rb, and Cs; 0<y<8) in embodiments of the present invention.

FIG. 6 shows far-IR and mid-IR spectra for xASH+ GeO$_2$+yH$_2$O reaction products (x=2 and 3; A=Na, K, Rb, and Cs; 0<y<8) in embodiments of the present invention. Vibrational modes attributable to Ge—S, Ge—O, and O—H bond stretching are observed with peak intensities between 457–403 cm$^{-1}$, 783–761 cm$^{-1}$, and 3413–3330 cm$^{-1}$, respectively. Additionally, H$_2$O and O—H rotatory (librations) modes are generally observed as sharp bands between 1145 and 534 cm$^{-1}$.

Figure 7:
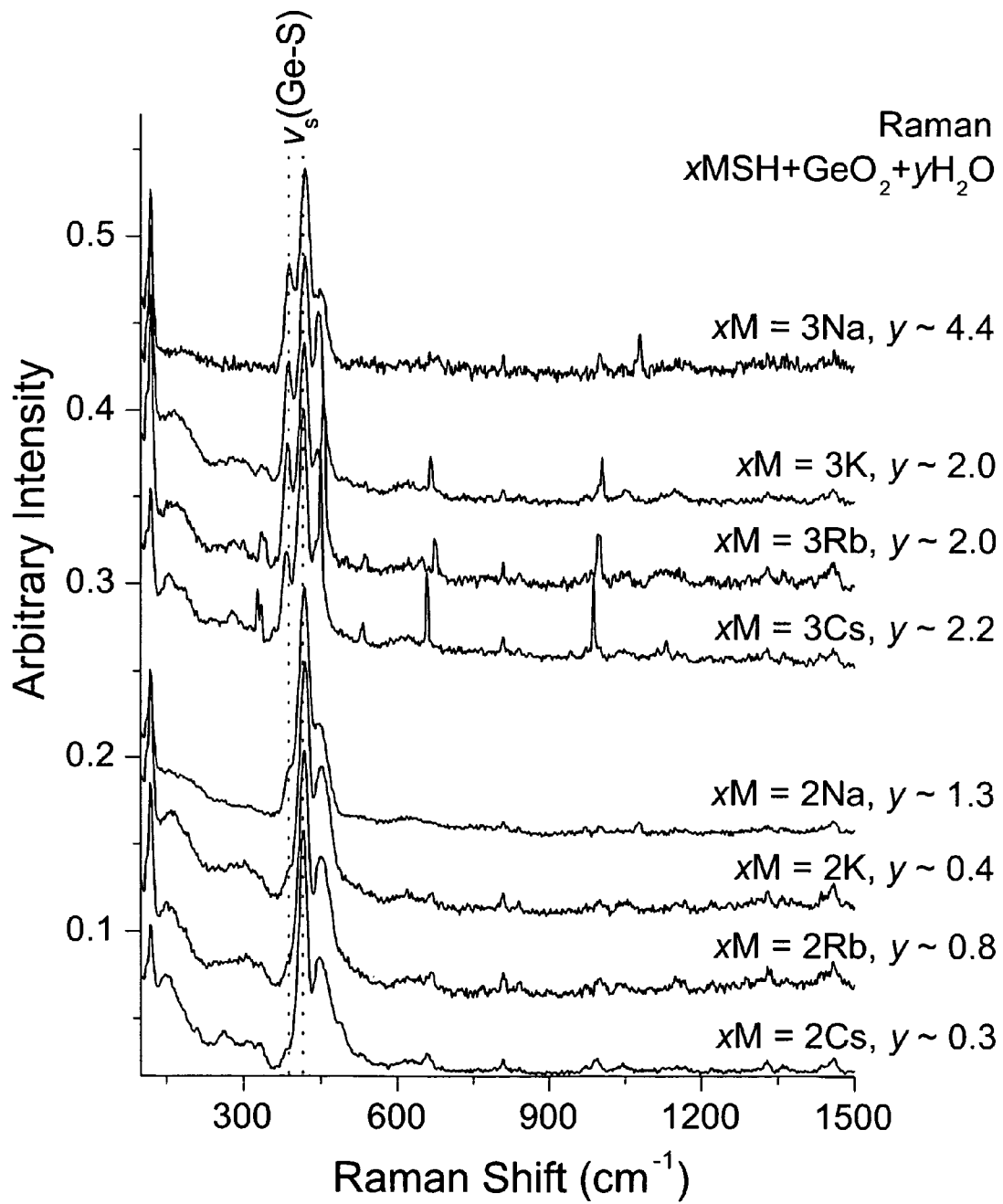
FIG. 7 shows Raman spectra for xASH+$GeO_2$+y$H_2O$ reaction products (x=2 and 3; A=Na, K, Rb, and Cs; 0<y<8) in embodiments of the present invention.

FIG. 7 shows Raman spectra for xASH+GeO$_2$+yH$_2$O reaction products (x=2 and 3; A=Na, K, Rb, and Cs; 0<y<8) in embodiments of the present invention. Vibrational modes attributable to Ge—S bond stretching are observed with peak intensities between 385 and 456 cm$^{-1}$. Sharp vibrational bands appearing at and above approximately 450 cm$^{-1}$ may be attributed to H$_2$O and O—H rotatory (librations) modes.

Figure 8:
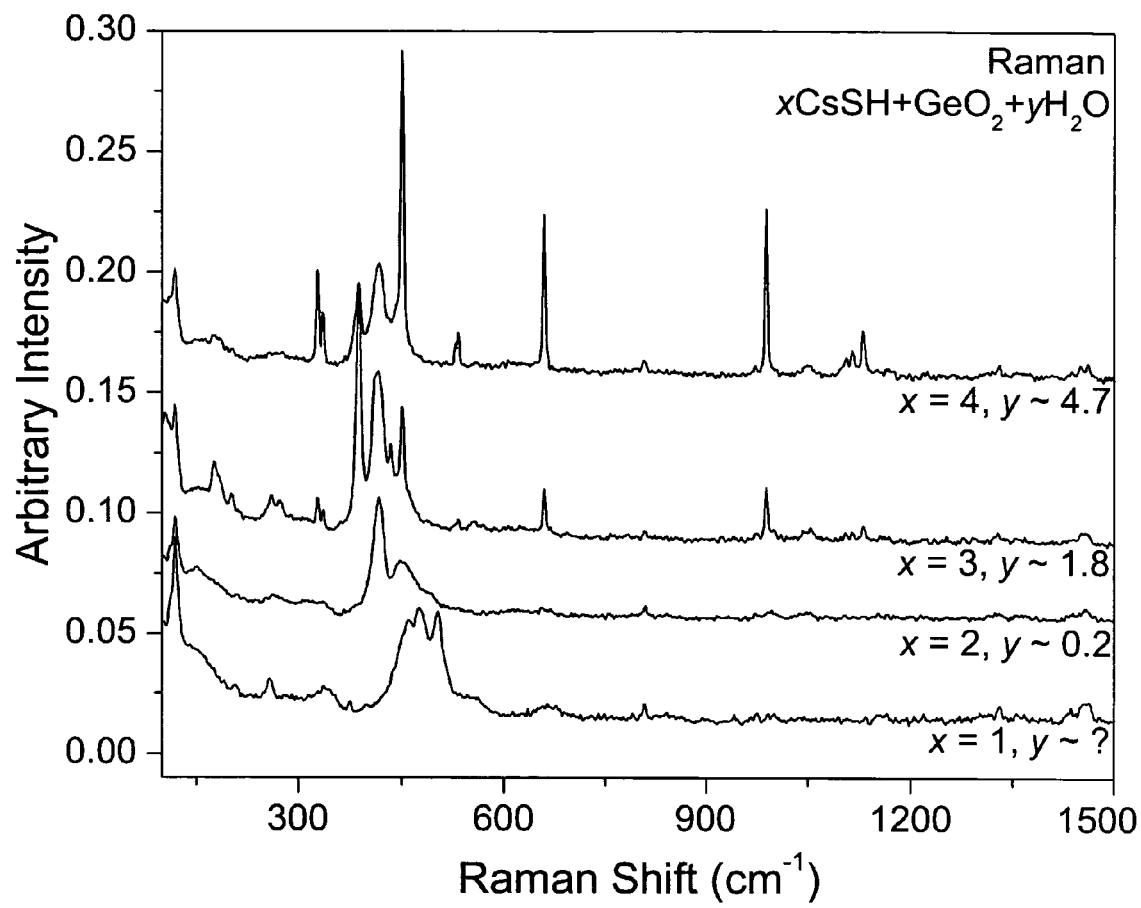
FIG. 8 shows Raman spectra for xCsSH+$GeO_2$+y$H_2O$ reaction products (x=1, 2, 3, and 4; 0<y<8) in embodiments of the present invention.

FIG. 8 shows Raman spectra for xCsSH+GeO$_2$+yH$_2$O reaction products (x=1, 2, 3, and 4; 0<y<8) in embodiments of the present invention. Vibrational modes attributable to Ge—S bond stretching are generally observed with peak intensities between 502 and 327 cm$^{-1}$. Sharp vibrational bands appearing at and above approximately 450 cm$^{-1}$ may be attributed to H$_2$O and O—H rotatory (librations) modes.

Figure 9:
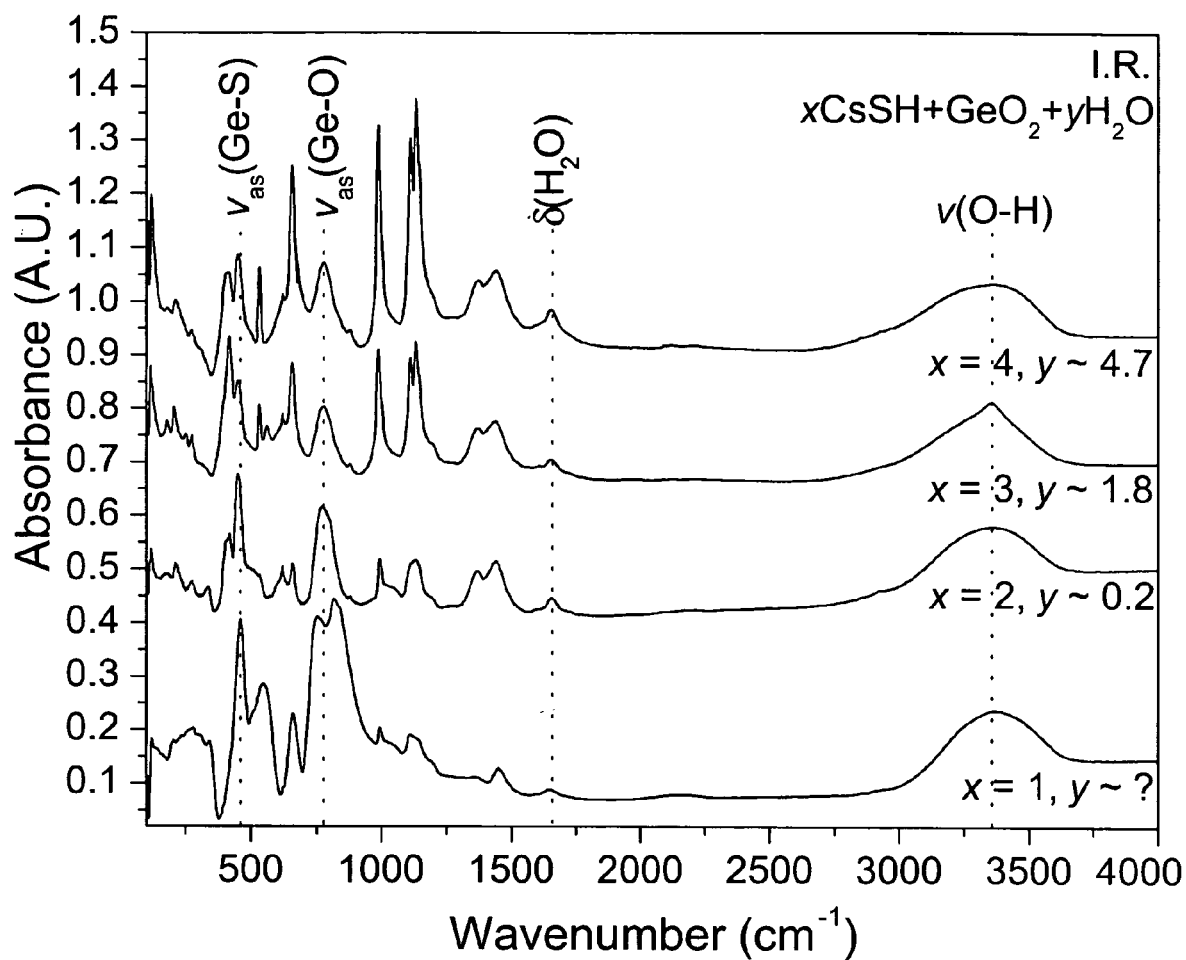
FIG. 9 shows far-IR and mid-IR spectra for xCsSH+$GeO_2$+y$H_2O$ reaction products (x=1, 2, 3, and 4; 0<y<8) in embodiments of the present invention.

FIG. 9 shows far-IR and mid-IR spectra for xCsSH+ GeO$_2$+yH$_2$O reaction products (x=1, 2, 3, and 4; 0<y<8) in embodiments of the present invention. Vibrational modes attributable to Ge—S, Ge—O, and O—H bond stretching are generally observed with peak intensities between 459–407 cm$^{-1}$, 819–754 cm$^{-1}$, and 3371–3353 cm$^{-1}$, respectively. Additionally, H$_2$O and O—H rotatory (librations) modes are generally observed as sharp bands between 1132 and 531 cm$^{-1}$.

Figure 10:
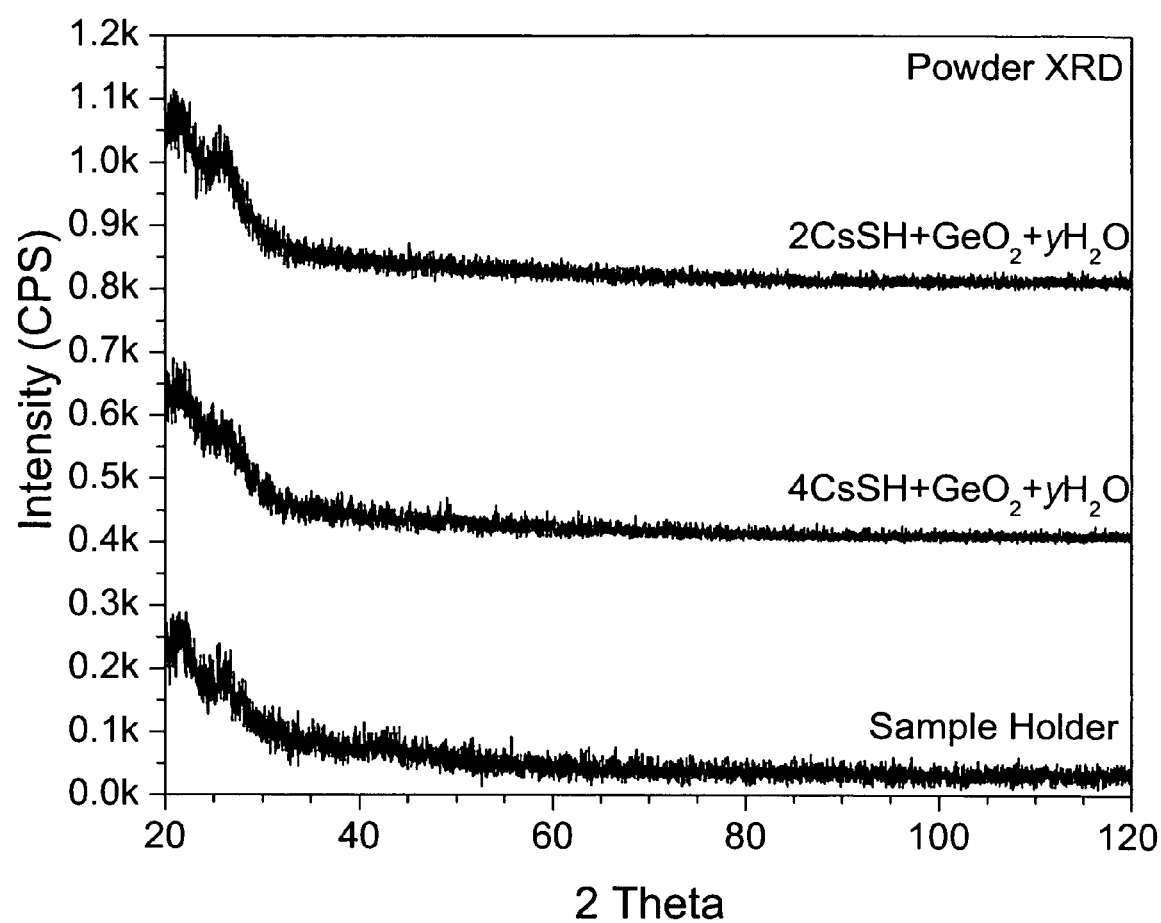
FIG. 10 shows powder XRD diffractograms for xCsSH+$GeO_2$+y$H_2O$ reaction products (x=2 and 4; 0<y<8) in embodimenta of the present invention.

FIG. 10 shows powder XRD diffractograms for xCsSH+ GeO$_2$+yH$_2$O reaction products (x=2 and 4; 0<y<8) in embodiment of the present invention. Scans were obtained from powdered samples covered with 0.001 inch thick Kapton® tape using a 0.020 step size and 0.5 second dwell time. An empty sample holder covered with tape is shown as a reference.

Figure 11:
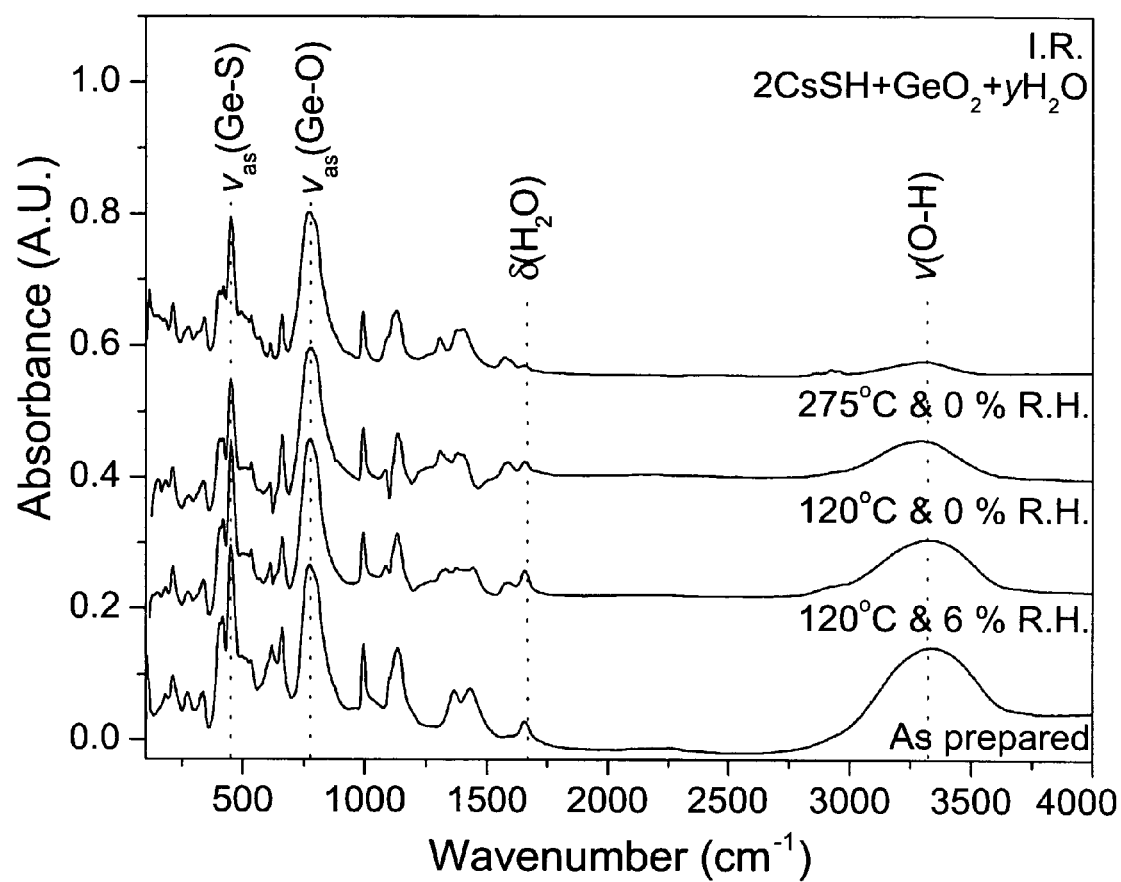
FIG. 11 shows far-IR and mid-IR spectra for 2CsSH+$GeO_2$+y$H_2O$ reaction products (0<y<8) after performing a.c. impedance measurements using dry or humidified air at a fixed temperature in embodiments of the present invention.

FIG. 11 shows far-IR and mid-IR spectra for 2CsSH+ GeO$_2$+yH$_2$O reaction products (0<y<8) after performing a.c. impedance measurements using dry or humidified air at a fixed temperature in embodiments of the present invention. The vibrational band intensities attributable to molecular H$_2$O and O—H groups are reduced with increasing temperature and decreasing relative humidity In contrast, vibrational modes attributable to structural Ge—S and Ge—O stretching are unchanged with dry air and temperatures as high as 275° C.

Figure 12:
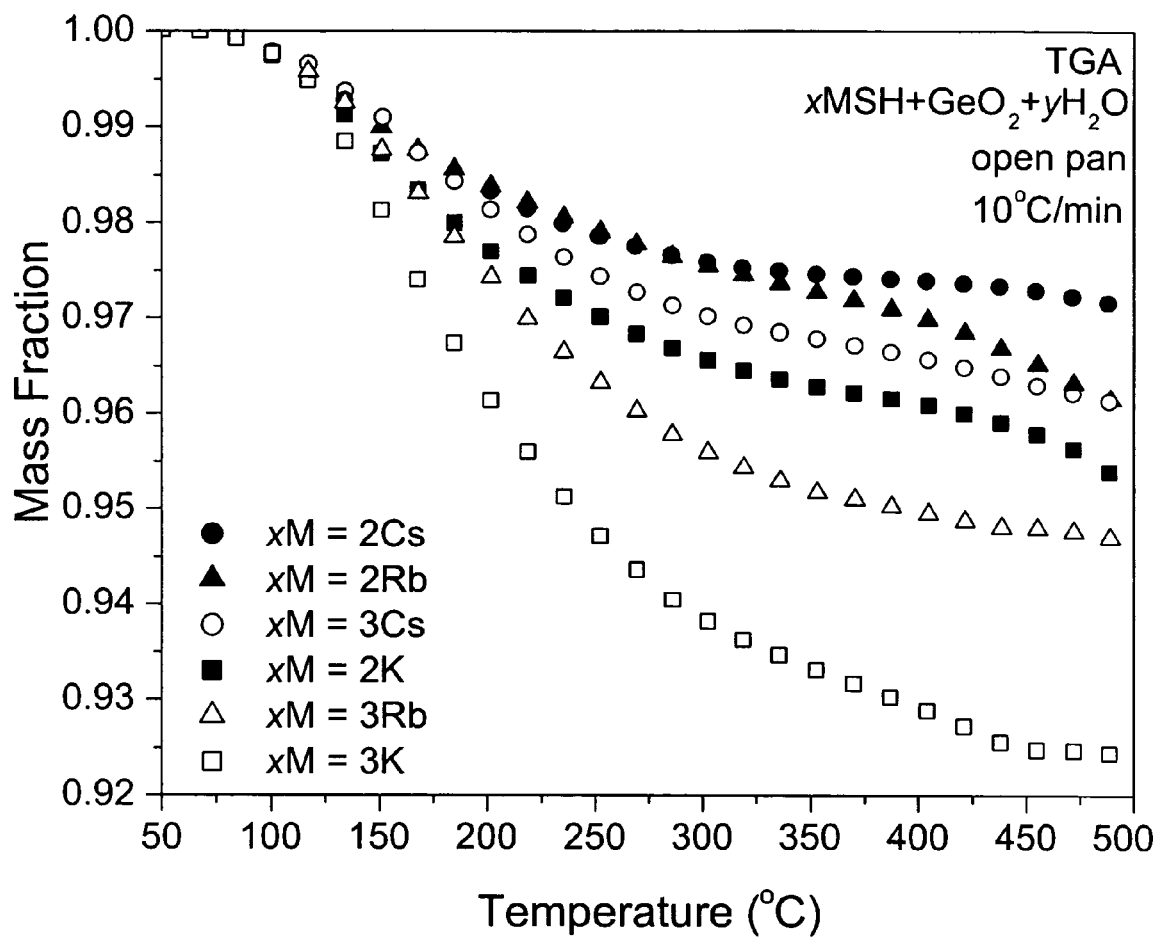
FIG. 12 shows TGA thermograms for amorphous xASH+$GeO_2$+y$H_2O$ reaction products (x=2 and 3; A=Na, K, Rb, and Cs; 0<y<8) in embodiments of the present invention.

FIG. 12 shows TGA thermograms for amorphous xASH+ GeO$_2$+yH$_2$O reaction products (x=2 and 3; A=Na, K, Rb, and Cs; 0<y<8) in embodiments of the present invention. Samples were placed in an open aluminum pan, heated at 10° C./minute, and purged with N$_2$. Continuous mass loss is observed above the preparation temperature of about 75° C. with a change in slope observable about 275° C.

Figure 13:
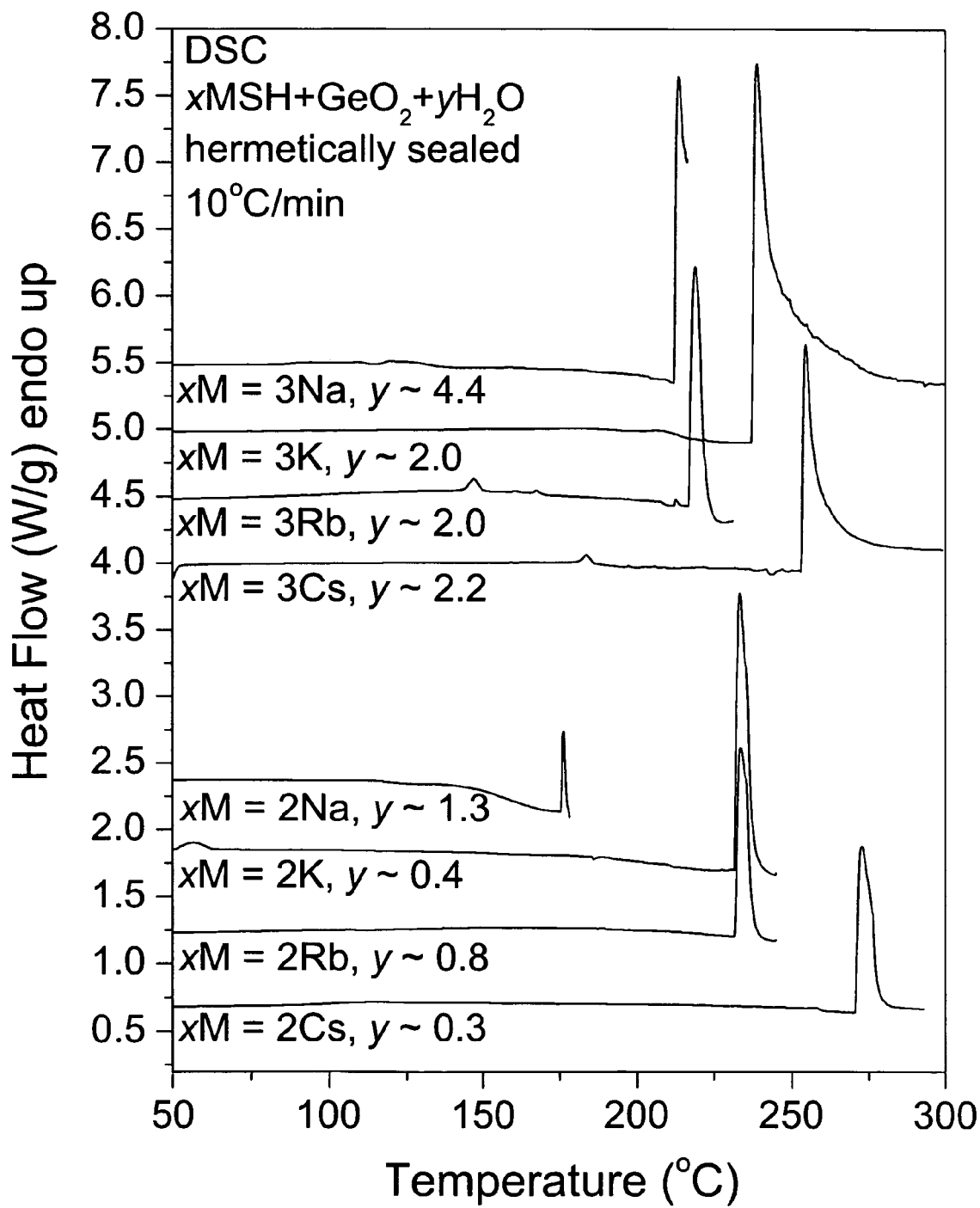
FIG. 13 shows DSC thermograms for amorphous xASH+$GeO_2$+y$H_2O$ reaction products (x=2 and 3; A=K, Rb, and Cs; 0<y<8) in embodiments of the present invention.

FIG. 13 shows DSC thermograms for amorphous xASH+ GeO$_2$+yH$_2$O reaction products (x=2 and 3; A=K, Rb, and Cs; 0<y<8) in embodiments of the present invention. Samples were hermetically sealed in aluminum pans, heated at 10° C./minute, and purged with N$_2$. For some samples, additional endothermic peaks were also recorded at slightly higher temperatures (not shown). The strong endothermic peaks observed between 175 and 270° C. suggest a crystalline water sub-lattice.

Figure 14:
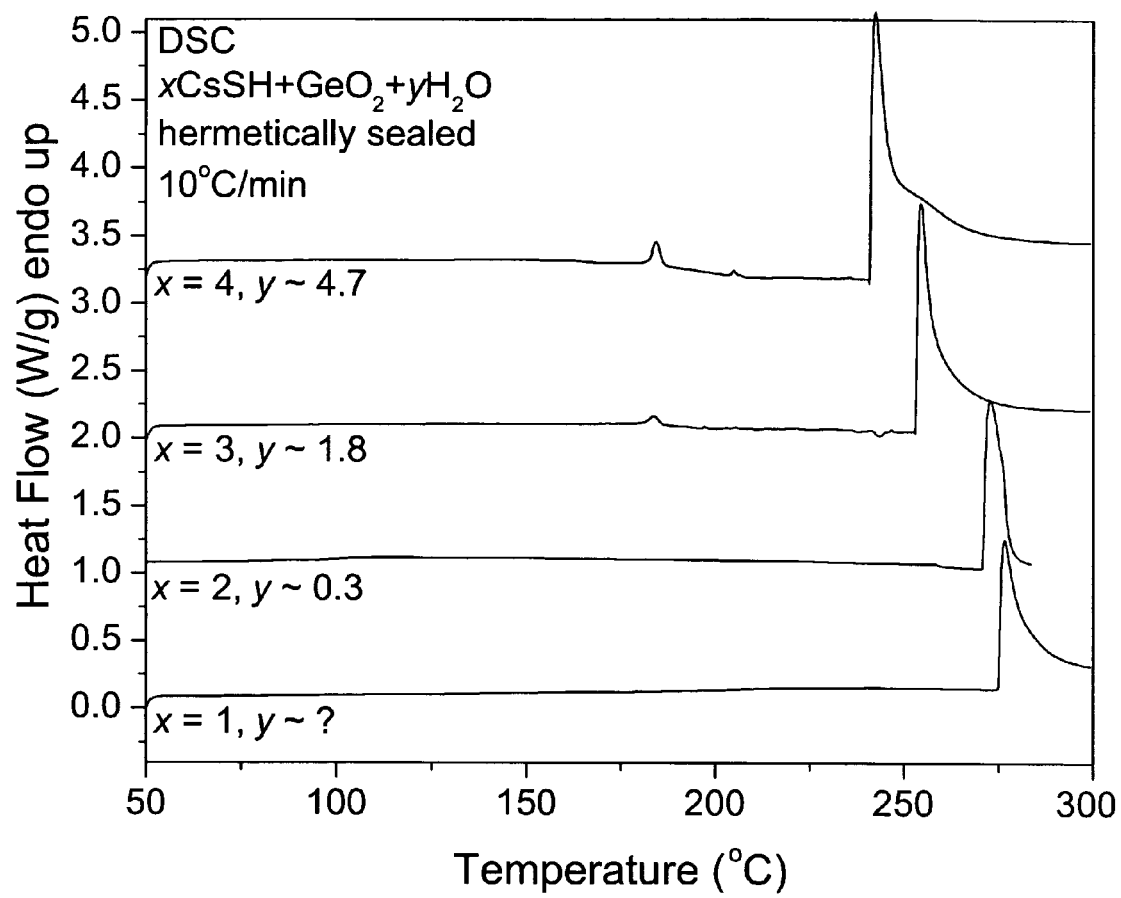
FIG. 14 shows DSC thermograms for amorphous xCsSH+$GeO_2$+y$H_2O$ reaction products (x=1, 2, 3 and 4; 0<y<8) in embodiments of the present invention.

FIG. 14 shows DSC thermograms for amorphous xCsSH+ GeO$_2$+yH$_2$O reaction products (x=1, 2, 3 and 4; 0<y<8) in embodiments of the present invention. Samples were hermetically sealed in aluminum pans, heated at 10° C./minute, and purged with $N_2$. Higher endothermic onset temperatures, going from 240 to 275° C., are observed with decreasing amounts of molecular $H_2O$.

Figure 15:
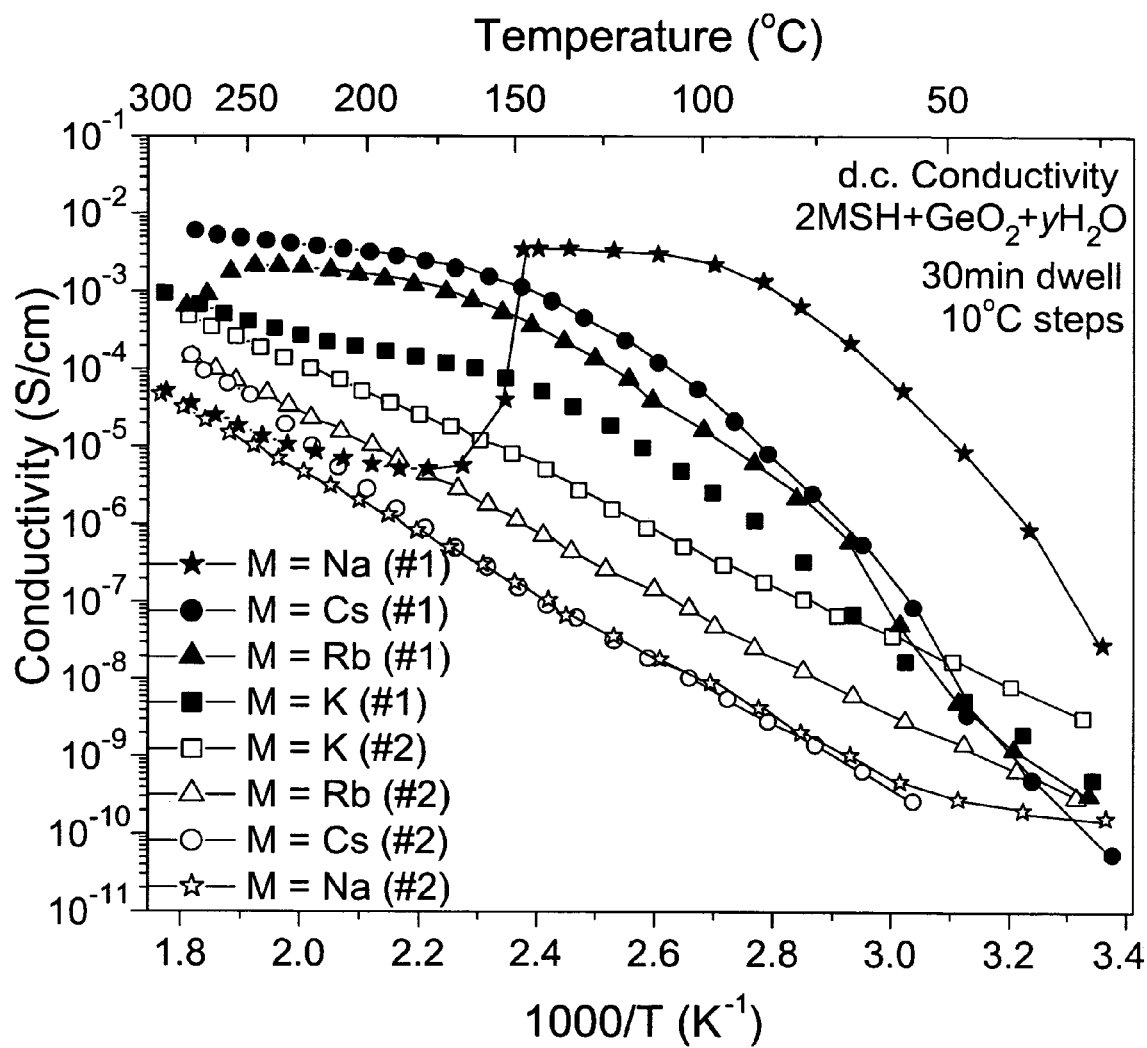
FIG. 15 is an Arrhenius temperature dependent plot of d.c. conductivity values for amorphous 2ASH+$GeO_2$+y$H_2O$ reaction products (A=Na, K, Rb, and Cs; 0<y<8) in embodiments of the present invention.

FIG. 15 is an Arrhenius temperature dependent plot of d.c. conductivity values for amorphous $2ASH+GeO_2+yH_2O$ reaction products (A Na, K, Rb, and Cs; 0<y<8) in embodiments of the present invention. Measurements were performed using 10° C. steps and 30 minute stabilization times on compacted powder pellets sealed in a Teflon® sleeve by harden steel electrodes.

Figure 16:
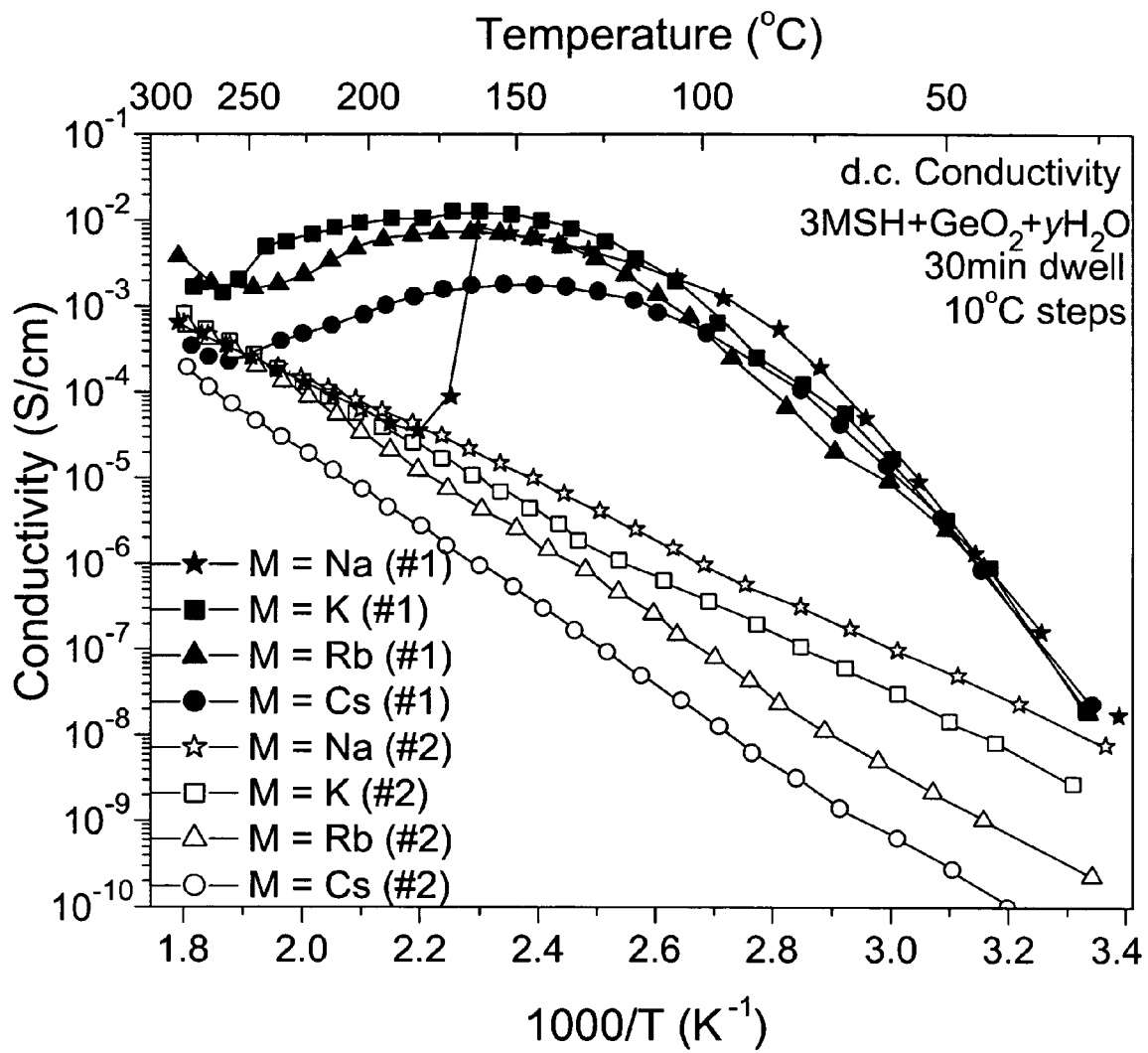
FIG. 16 is an Arrhenius temperature dependent plot of d.c. conductivity values for 3ASH+$GeO_2$+y$H_2O$ reaction products (A=Na, K, Rb, and Cs; 0<y<8) in embodiments of the present invention.

FIG. 16 is an Arrhenius temperature dependent plot of d.c. conductivity values for $3ASH+GeO_2+yH_2O$ reaction products (A=Na, K, Rb, and Cs; 0<y<8) for the first and second heating cycles (as defined in Example 1) in embodiments of the present invention. Measurements were performed using 10° C. steps and 30 minute stabilization times on compacted powder pellets sealed in a Teflon sleeve by harden steel electrodes.

Figure 17:
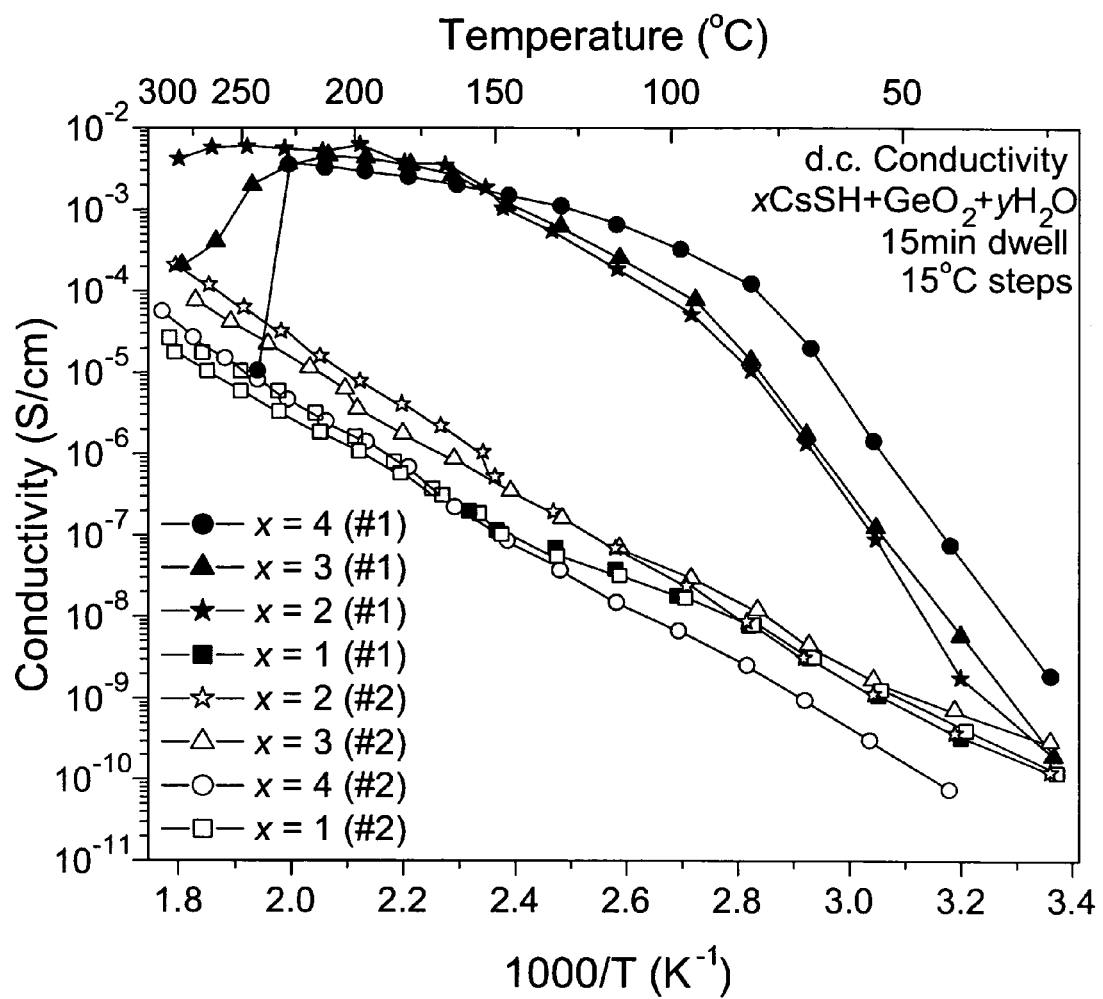
FIG. 17 is an Arrhenius temperature dependent plot of d.c. conductivity values for amorphous xCsSH+$GeO_2$+y$H_2O$ reaction products (x=1, 2, 3 and 4; 0<y<8) in embodiments of the present invention.

FIG. 17 is an Arrhenius temperature dependent plot of d.c. conductivity values for amorphous $xCsSH+GeO_2+yH_2O$ reaction products (x=1, 2, 3 and 4; 0<y<8) for the first and second heating cycles (as defined in Example 1) in embodiments of the present invention. Measurements were performed using 15° C. steps and 15 minute stabilization times on compacted powder pellets sealed in a Teflon® sleeve by harden steel electrodes.

From the measurements it is generally observed that $xASH+GeO_2+yH_2O$ reactions for x=1 do not appear to produce useful mixed anions with high conductivity, although reactions with x>1 do produce useful materials with high protonic conductivity.

EXAMPLE 3

$A_xMS_x(OH)_{4-x} \cdot yH_2O$ ($1 \leq x < 4$; 0<y<8) for A=Na, M=Ti, Zr and $A_xMS_x(OH)_{3-x} \cdot yH_2O$ for M=La All test conditions were as described above in Example 1, including synthesis methods and equipment, structural characterizations, thermal characterizations and conductivity measurements. However, in this example, the materials synthesized were of the form: $A_xMS_x(OH)_{4-x} \cdot yH_2O$ ($1 \leq x \leq 4$; 0<y<8) for A=Na, M=Ti, Zr and $A_xMS_x(OH)_{3-x} \cdot yH_2O$ for M=La.

The corresponding reaction may be written as:

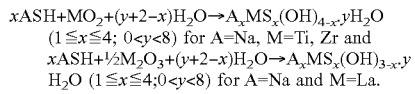

$xASH+MO_2+(y+2-x)H_2O \rightarrow A_xMS_x(OH)_{4-x} \cdot yH_2O$
($1 \leq x \leq 4$; 0<y<8) for A=Na, M=Ti, Zr and
$xASH+\frac{1}{2}M_2O_3+(y+2-x)H_2O \rightarrow A_xMS_x(OH)_{3-x} \cdot yH_2O$ ($1 \leq x \leq 4$; 0<y<8) for A=Na and M=La.

Results

Figure 18:
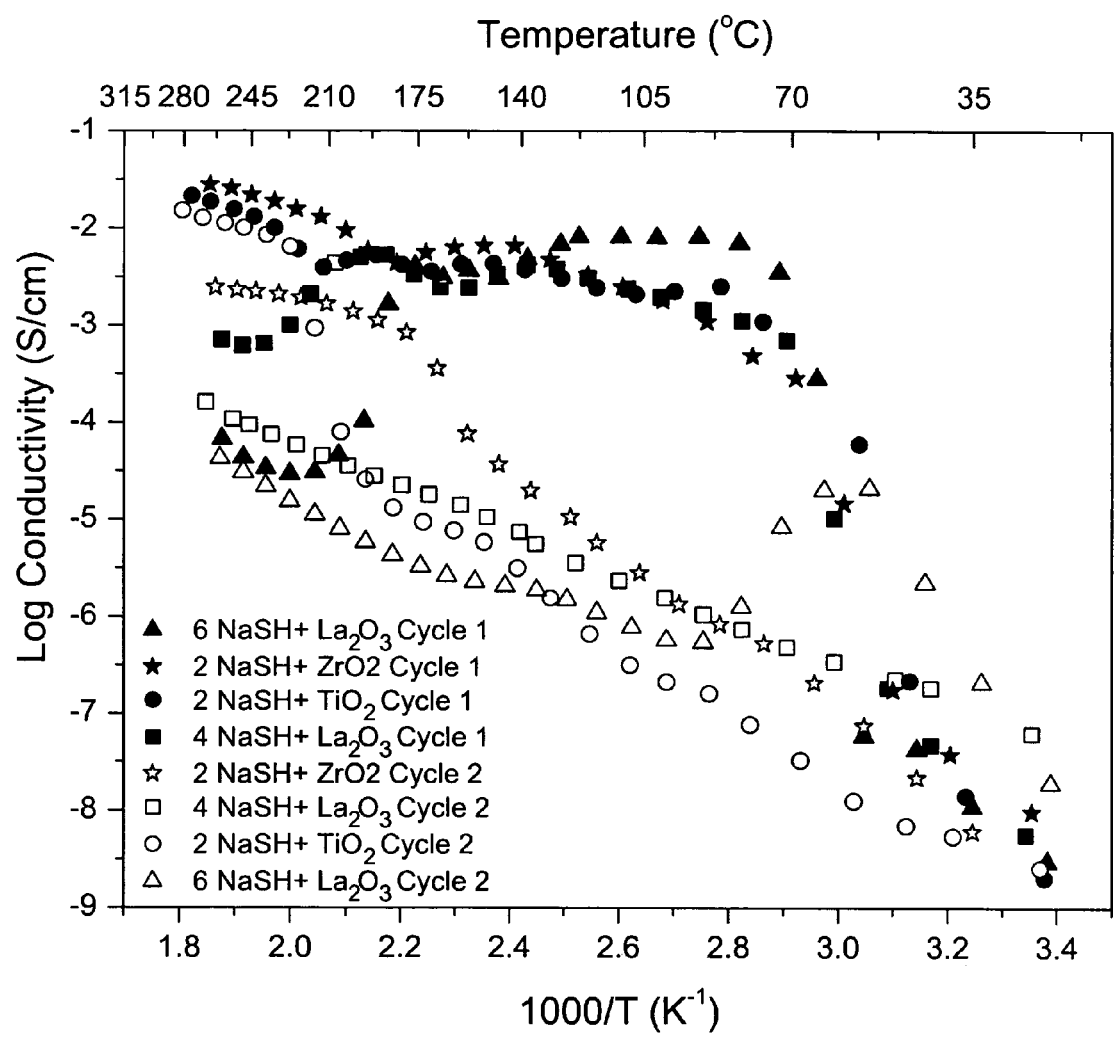
FIG. 18 is an Arrhenius temperature dependent plot of d.c. conductivity values for 6NaSH+$La_2O_3$+n$H_2O$, 4NaSH+$La_2O_3$+n$H_2O$, 2NaSH+$ZrO_2$+n$H_2O$, 2NaSH+$TiO_2$+n$H_2O$ reaction products (where n>0) in embodiments of the present invention.

FIG. 18 is an Arrhenius temperature dependent plot of d.c. conductivity values for $6NaSH+La_2O_3+nH_2O$, $4NaSH+La_2O_3+nH_2O$, $2NaSH+ZrO_2+nH_2O$, $2NaSH+TiO_2+nH_2O$ reaction products (where n=0 to 8) for the first and second heating cycles (as defined in Example 1) in embodiments of the present invention. Measurements were performed using 10° C. steps and 30 minute stabilization times on compacted powder pellets sealed in a Teflon sleeve by harden steel electrodes.

From these measurements, it is shown that other combinations of alkali, metals and metalloids can be used to produce materials with good protonic conductivity.

CONCLUSION

The present invention provides, in various embodiments, a new class of mixed anion chalcogenides for intermediate temperature proton conductors. In one embodiment, the materials are thio-oxoanions, which possess a combination of thermally stable hydroxyl groups and hydrophilic alkali associated with the non-bridging sulfurs. The unique materials described herein, including their compositional variants, are useful as proton conductors for hydrated conditions above the steam point common to many applications including fuel cells. In other embodiments, the novel materials include hydrosulfides, salts and oxysulfides. Other embodiments of the invention include anhydrous materials useful for conditions which are not hydrated, i.e., below the steam point.

The present invention provides new proton conducting materials and methods for making same, and new uses for existing compounds as proton exchange membranes. These membranes are able to operate over a large temperature range of about 100° C. to 300° C. In one embodiment, the material is any proton conductor having a mixed complex ion built upon a central metal or metalloid cation. These can include hydrated or anhydrous mixed anion proton conductors such as hydroxides, hydrosulfides, salts and oxysulfides.

It is also possible to optimize chalcogenide host materials in terms of thermal and chemical stability into which the greatest concentration of protons can be incorporated. Other optimizations may decrease solubility and increase conductivity. Thus far, Ge-based hydrated materials have been the most successful, although the invention is not so limited. It is expected that several other chalcogenide materials will also be successful, including, but not limited to M=Ti, Zr and La. Proton conductivity in the various membrane materials has been determined through impedance measurements as a function of temperature and frequency. DC polarization experiments have been used to determine the electronic verses ionic conductivity of the samples; all data reported here is predominately ionic in nature. Physical properties of the membrane materials have been determined, including decomposition and phase transition temperatures. Structural comparisons have been used to examine stability with exposure to water, oxygen and carbon dioxide.

Additional testing of these materials in the intermediate temperature range, with higher relative humidities can be performed in a membrane electrode assembly (MEA) test setup. Other parameters to be optimized include solubility levels, dimension stability, current density, catalyst selection, thin film synthesis procedures and long term performance, and the like. Economic concerns are also relevant to commercial embodiments and can be factor in material selection as well as procedural steps followed.

Although the present invention has been described in considerable detail with reference to certain preferred versions thereof, other versions are possible. Therefore, the spirit and scope of the appended claims should not be limited to the description of the preferred embodiments contained herein.

The invention claimed is:

1. A partially crystalline or amorphous material comprising:
$A_vM_wD_x(EH)_y \cdot (zH_2O)$ wherein
A is one or more modifying cations;
M is one or more metals, metalloids, transition metals or rare earth elements;
D and E are different Group VIB elements selected from the group consisting of O, S, Se, and Te;

v, w, x, and y are positive integer numbers; and
z>0.

2. The material of claim 1 wherein the material has a mixed complex anion $M_wD_xE_y^{-(x+y)}$.

3. The material of claim 1 wherein M is a transition metal.

4. The material of claim 3 wherein the transition metal is yterrium, titanium, or zirconium.

5. The material of claim 1 wherein M is a metalloid.

6. The material of claim 5 wherein the metalloid is Ge.

7. The material of claim 5 wherein the metalloid is Si.

8. The material of claim 1 wherein the rare earth element is a lanthanide.

9. The material of claim 8 wherein the lanthanide is lanthanum.

10. The material of claim 1 wherein the one or more modifying cations is selected from the group consisting of an alkali metal cation, alkaline earth cation, yterrium cation, rare earth cation and combinations thereof.

11. The material of claim 1 wherein v>1, w=1, x+y<4.

12. The material of claim 1 wherein 0<z<8.

13. The material of claim 1 wherein 0<z<5.

14. The material of claim 1 wherein D is selected from the group consisting of S, Se, and Te, and E is the element O.

15. The material of claim 1 wherein D is selected from the group consisting of O, Se, and Te, and E is the element S.

16. The material of claim 1 wherein D and E are different elements selected from the group consisting of O and S.

17. The material of claim 1 wherein D and E are different elements selected from the group consisting of O and Se, O and Te, S and Se, S and Te, and Se and Te.

18. The material of claim 1 wherein the proton conductivity is between about $10^{-8}$ S/cm and $10^{-1}$ S/cm within a temperature range of between about −60 and 300° C.

19. The material of claim 18 wherein the relative humidity is less than about 12%.

20. The material of claim 1 wherein more than one M is present.

21. The material of claim 20 wherein each of the more than one M is a different element selected from the group consisting of metals, metalloids, transition metals, rare earth elements, and combinations thereof.

22. The material of claim 20 wherein each of the more than one M is an identical element selected from the group consisting of metals, metalloids, transition metals and rare earth elements.

23. The material of claim 20 wherein each of the more than one M is present in varying amounts.

24. The material of claim 20 wherein two Ms are present such that the material comprises $A_vM_wM'_uD_x(EH)_y\cdot(zH_2O)$, wherein M is a first metal, metalloid, transition metal or rare earth element;

M' is a second metal, metalloid, transition metal or rare earth element; and u and w are positive integer numbers.

25. The material of claim 24 wherein w≠u.

26. The material of claim 24 wherein M is different than M'.

27. The material of claim 26 wherein M=Ge and M'=Zr.

28. The material of claim 20 wherein three or more Ms are present.

29. A partially crystalline or amorphous material comprising:

a hydrated alkali thio-hydroxogermanate $A_vGeS_v(OH)_{4-v}\cdot zH_2O$, wherein A is an alkali metal;

1<v<4; and
0<z<8.

30. The material of claim 29 wherein 0<z<5.

31. The material of claim 30 wherein the ionic conductivity is between about $10^{-3}$ and $10^{-2}$ S/cm for temperatures between about 100° C. and 275° C.

32. The material of claim 31 wherein the relative humidity is less than about 12%.

33. A partially crystalline or amorphous material comprising a hydrated cesium thio-hydroxogermanate $Cs_3GeS_3(OH)\cdot zH_2O$ wherein 0<z<8.

34. The material of claim 33 wherein 0<z<5.

35. The material of claim 33 wherein the ionic conductivity is between about $10^{-3}$ and $10^{-2}$ S/cm for temperatures between about 100° C. and 275° C.

36. The material of claim 35 wherein the relative humidity is less than about 12%.

37. A partially crystalline or amorphous material comprising a hydrated rubidium thio-hydroxogermanate $Rb_2GeS_2(OH)_2\cdot zH_2O$ wherein 0<z<8.

38. The material of claim 37 wherein 0<z<5.

39. The material of claim 37 wherein the ionic conductivity is between about $10^{-3}$ and $10^{-2}$ S/cm for temperatures between about 100° C. and 275° C.

40. The material of claim 39 wherein the relative humidity is less than about 12%.

41. A partially crystalline or amorphous material comprising a hydrated potassium thio-hydroxogermanate $K_2GeS_2(OH)_2\cdot zH_2O$ wherein 0<z<8.

42. The material of claim 41 wherein 0<z<5.

43. The material of claim 41 wherein the ionic conductivity is between about $10^{-3}$ and $10^{-2}$ S/cm for temperatures between about 100° C. and 275° C.

44. The material of claim 43 wherein the relative humidity is less than about 12%.

45. A partially crystalline or amorphous material comprising a hydrated sodium thio-hydroxogermanate $Na_2GeS_2(OH)_2\cdot zH_2O$ wherein 0<z<8.

46. The material of claim 45 wherein 0<z<5.

47. The material of claim 45 wherein the ionic conductivity is between about $10^{-3}$ and $10^{-2}$ S/cm for temperatures between about 100° C. and 275° C.

48. The material of claim 47 wherein the relative humidity is less than about 12%.

49. A partially crystalline or amorphous compound comprising:

$A_vM_wD_x(EH)_y\cdot(zH_2O)$, wherein

A is one or more modifying cations;

M is one or more metals, metalloids, transition metals or rare earth elements;

D and E are different Group VIB elements selected from the group consisting of O, S, Se, and Te;

v, w, x, and y are positive integer numbers; and z>0.

50. The compound of claim 49 wherein the compound has a mixed complex anion $M_wD_xE_y^{-(x+y)}$.

51. The compound of claim 49 wherein M is a transition metal.

52. The compound of claim 49 wherein the transition metal is yterrium, titanium, or zirconium.

53. The compound of claim 49 wherein M is a metalloid.

54. The compound of claim 53 wherein metalloid is Ge.

55. The compound of claim 53 wherein the metalloid is Si.

56. The compound of claim 49 wherein the rare earth element is a lanthanide.

57. The compound of claim 56 wherein the lanthanide is lanthanum.

58. The compound of claim 49 wherein the one or more modifying cations is selected from the group consisting of an alkali metal cation, alkaline earth cation, yterrium cation, rare earth cation and combinations thereof.

59. The compound of claim 49 wherein v>1, w=1, x+y<4.

60. The compound of claim 49 wherein 0<z<5.

61. The compound of claim 49 wherein D is selected from the group consisting of S, Se, and Te, and E is the element O.

62. The compound of claim 49 wherein D is selected from the group consisting of O, Se, and Te, and E is the element S.

63. The compound of claim 49 wherein D and E are different elements selected from the group consisting of O and S.

64. The compound of claim 49 wherein D and E are different elements selected from the group consisting of O and Se, O and Te, S and Se, S and Te, and Se and Te.

65. The compound of claim 49 wherein the proton conductivity is between about $10^{-8}$ S/cm and $10^{-1}$ S/cm within a temperature range of between about −60 and 300° C.

66. The compound of claim 43 wherein more than one M is present.

67. The compound of claim 66 wherein each of the more than one M is a different element selected from the group consisting of metals, metalloids, transition metals, rare earth elements, and combinations thereof.

68. The compound of claim 66 wherein each of the more than one M is an identical element selected from the group consisting of metals, metalloids, transition metals, and rare earth elements.

69. The compound of claim 66 wherein each of the more than one M is present in varying amounts.

70. The compound of claim 66 wherein two Ms are present such that the material comprises $A_vM_wM'_uD_x(EH)_y\cdot(zH_2O)$, wherein
   M is a first metal, metalloid, transition metal or rare earth element;
   M' is a second metal, metalloid, transition metal or rare earth element; and
   u and w are positive integer numbers.

71. The compound of claim 70 wherein w≠u.

72. The compound of claim 70 wherein M is different than M'.

73. The compound of claim 72 wherein M=Ge and M'=Zr.

74. The compound of claim 66 wherein three or more Ms are present.

75. A partially crystalline or amorphous compound comprising a hydrated alkali thio-hydroxogermanate $A_vGeS_v(OH)_{4-v}\cdot zH_2O$, wherein
   A is an alkali metal;
   1<v<4; and
   z>0.

76. The compound of claim 75 wherein 0<z<5.

77. The compound of claim 75 wherein the ionic conductivity is between about $10^{-3}$ and $10^{-2}$ S/cm for temperatures between about 100° C. and 275° C.

78. The compound of claim 77 wherein the relative humidity is less than about 12%.

79. A compound comprising a hydrated cesium thio-hydroxogermanate $Cs_3GeS_3(OH)\cdot zH_2O$ wherein 0<z<8.

80. The compound of claim 79 wherein 0<z<5.

81. The compound of claim 79 wherein the ionic conductivity is between about $10^{-3}$ and $10^{-2}$ S/cm for temperatures between about 100° C. and 275° C.

82. The compound of claim 81 wherein the relative humidity is less than about 12%.

83. The compound of claim 79 wherein the compound is partially crystalline.

84. The compound of claim 79 wherein the compound is crystalline.

85. A compound comprising a hydrated rubidium thio-hydroxogermanate $Rb_2GeS_2(OH)_2\cdot zH_2O$ wherein 0<z<8.

86. The compound of claim 85 wherein 0<z<5.

87. The compound of claim 85 wherein the ionic conductivity is between about $10^{-3}$ and $10^{-2}$ S/cm for temperatures between about 100° C. and 275° C.

88. The compound of claim 87 wherein the relative humidity is less than about 12%.

89. The compound of claim 88 wherein the compound is partially crystalline.

90. The compound of claim 85 wherein the compound is crystalline.

91. A compound comprising a hydrated potassium thio-hydroxogermanate $K_2GeS_2(OH)_2\cdot zH_2O$ wherein 0<z<8.

92. The compound of claim 91 wherein 0<z<5.

93. The compound of claim 91 wherein the ionic conductivity is between about $10^{-3}$ and $10^{-2}$ S/cm for temperatures between about 100° C. and 275° C.

94. The compound of claim 93 wherein the relative humidity is less than about 12%.

95. The compound of claim 91 wherein the compound is partially crystalline.

96. The compound of claim 91 wherein the compound is crystalline.

97. A crystalline compound comprising a hydrated sodium thio-hydroxogermanate $Na_2GeS_2(OH)_2\cdot zH_2O$ wherein 0<z<5.

98. The compound of claim 97 wherein the ionic conductivity is between about $10^{-3}$ and $10^{-2}$ S/cm for temperatures between about 100° C. and 275° C.

99. The compound of claim 98 wherein the relative humidity is less than about 12%.

100. An amorphous or partially crystalline compound comprising a hydrated sodium thio-hydroxogermanate $Na_2GeS_2(OH)_2\cdot zH_2O$ wherein 0<z<8.

101. The compound of claim 100 wherein 0<z<5.

102. The compound of claim 100 wherein the ionic conductivity is between about $10^{-3}$ and $10^{-2}$ S/cm for temperatures between about 100° C. and 275° C.

103. The compound of claim 102 wherein the relative humidity is less than about 12%.

104. A crystalline compound comprising:
   $A_vM_wD_x(EH)_y\cdot(zH_2O)$, wherein
   A is one or more modifying cations;
   M is one or more metals, metalloids, transition metals or rare earth elements;
   D and E are different Group VIB elements selected from the group consisting of O, S, Se, and Te;
   v, w, x, and y are positive integer numbers; and
   0<z<5.

105. A crystalline compound comprising a hydrated alkali thio-hydroxogermanate $A_vGeS_v(OH)_{4-v}\cdot zH_2O$, wherein
   A is an alkali metal;
   1<v<4; and
   0<z<5.

* * * * *

UNITED STATES PATENT AND TRADEMARK OFFICE
CERTIFICATE OF CORRECTION

PATENT NO. : 7,101,527 B1
APPLICATION NO. : 10/848967
DATED : September 5, 2006
INVENTOR(S) : Poling et al.

It is certified that error appears in the above-identified patent and that said Letters Patent is hereby corrected as shown below:

On the Title page, item (56), under "Foreign Patent Documents", in column 1, line 1, after "8/2000" insert -- H01 M --.

On the Title page, item (56), under "Other Publications", in column 1, line 8, delete "$Na_2GeS_2(OH)_2\ 5\ H_2O$" and insert -- $Na_2GeS_2(OH)_2 \cdot 5H_2O$ --, therefor.

On the Title page, item (56), under "Other Publications", in column 2, line 15, delete "Tabe" and insert -- Table --, therefor.

On the Title page, item (56), under "Other Publications", in column 2, line 33, delete "Stelle" and insert -- Steele --, therefor.

On the Title page, item (74), in "Attorney, Agent, or Firm", in column 2, line 1, delete "Schweqman" and insert -- Schwegman --, therefor.

On Title page 2, in field (56), under "Other Publications", in column 1, line 13, delete "$0 \leq X \leq 075$" and insert -- $0 \leq X \leq 0.75$ --, therefor.

On Sheet 17 of 17, in FIG.18, line 2, delete "ZrO2" and insert -- $ZrO_2$ --, therefor.

On Sheet 17 of 17, in FIG.18, line 5, delete "ZrO2" and insert -- $ZrO_2$ --. therefor.

In column 3, line 11, after "materials" insert -- and compounds --.

In column 4, line 18, delete "embodimenta" and insert -- embodiments --, therefor.

In column 5, line 21, after ""chalcogenide"" delete "as used herein".

In column 5, line 59, delete "$M^W D_x E_y^{-u}$" and insert -- $M_w D_x E_y^{-u}$ --, therefor.

In column 6, line 36, delete "$A_v MwDx(EH)_y \cdot (zH_2O)$" and insert
-- $A_v M_w D_x(EH)_y \cdot (zH_2O)$ --, therefor.

In column 7, line 21, delete "forgoing" before "foregoing".

In column 7, line 26 delete "$A_v MwDx(EH)_y$" and insert -- $A_v M_w D_x(EH)_y$ --, therefor.

In column 9, line 15, delete "$A_X GeS_x(OH)_{4-x}\ yH_2O$" and insert
-- $A_X GeS_x(OH)_{4-x} \cdot yH_2O$--, therefor.

UNITED STATES PATENT AND TRADEMARK OFFICE
CERTIFICATE OF CORRECTION

PATENT NO. : 7,101,527 B1
APPLICATION NO. : 10/848967
DATED : September 5, 2006
INVENTOR(S) : Poling et al.

It is certified that error appears in the above-identified patent and that said Letters Patent is hereby corrected as shown below:

In column 9, lines 26-27, delete "$A_xGeS_x(OH)_{4-x}\,yH_2O$" and insert -- $A_xGeS_x(OH)_{4-x} \cdot yH_2O$ --, therefor.

In column 13, line 63, after "Rb" insert -- ,and --.

In column 14, line 36, delete "0.020" and insert -- $0.02^0$ --, therefor.

In column 15, line 7, after "A" insert -- = --.

In column 15, line 39, delete "$1 \leq x < 4$" and insert -- $1 \leq x \leq 4$ --, therefore.

In column 17, line 19, in Claim 11, delete "$x+y<4$" and insert -- $x+y \leq 4$ --, therefor.

In column 18, line 63, in Claim 54, after "wherein" insert -- the --.

In column 19, line 7, in Claim 59 delete "$x+y<4$" and insert -- $x+y \leq 4$ --, therefor.

In column 19, line 24, in Claim 66, delete "claim 43" and insert -- claim 49 --, therefor.

Signed and Sealed this

Nineteenth Day of December, 2006

JON W. DUDAS
*Director of the United States Patent and Trademark Office*